United States Patent
He et al.

(10) Patent No.: US 9,602,378 B2
(45) Date of Patent: Mar. 21, 2017

(54) ROUTE DECISION METHOD, CONTENT DELIVERY APPARATUS, AND CONTENT DELIVERY NETWORK INTERCONNECTION SYSTEM

(71) Applicant: HUAWEI TECHNOLOGIES CO., LTD., Shenzhen (CN)

(72) Inventors: Xiaoyan He, Xi'an (CN); Jincheng Li, Xi'an (CN); Jing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 440 days.

(21) Appl. No.: 14/095,265

(22) Filed: Dec. 3, 2013

(65) Prior Publication Data
US 2014/0095707 A1   Apr. 3, 2014

Related U.S. Application Data

(63) Continuation of application No. PCT/CN2011/075300, filed on Jun. 3, 2011.

(51) Int. Cl.
*G06F 15/173* (2006.01)
*H04L 12/26* (2006.01)
(Continued)

(52) U.S. Cl.
CPC ........ *H04L 43/0876* (2013.01); *H04L 45/125* (2013.01); *H04L 67/1029* (2013.01);
(Continued)

(58) Field of Classification Search
CPC ............ H04L 67/1029; H04L 67/2814; H04N 7/17327; H04N 7/17336
(Continued)

(56) References Cited

U.S. PATENT DOCUMENTS 7,519,734 B1 * 4/2009 Dumitriu ............ H04L 67/1029
709/238
2005/0188073 A1   8/2005 Nakamichi et al.
(Continued)

FOREIGN PATENT DOCUMENTS

CN         1859213        11/2006
CN       101263460         9/2008
(Continued)

OTHER PUBLICATIONS

PCT International Search Report and Written Opinion of the International Searching Authority dated Mar. 15, 2012 in corresponding International Patent Application No. PCT/CN2011/075300.

*Primary Examiner* — Kyung H Shin
(74) *Attorney, Agent, or Firm* — Staas & Halsey LLP

(57) ABSTRACT

Embodiments of the present invention relate to a route decision method, a content delivery apparatus, and a content delivery network interconnection system. A route decision method includes: receiving a notification message sent by a downstream CDN; determining a current service aggregate according to the notification message; and according to the current service aggregate and a total service quantity thresholdtotal quantity of services, performing route decision on a to-be-forwarded user request, where the total service quantity thresholdtotal quantity of services is an upper limit, set by the downstream CDN, of services capable of being provided by the downstream CDN for an upstream CDN. The embodiments of the present invention improve the accuracy of an upstream CDN in selecting a downstream CDN for a to-be-forwarded user request, and thereby improve the route decision efficiency.

32 Claims, 9 Drawing Sheets

(51) Int. Cl.
*H04L 29/08* (2006.01)
*H04N 7/173* (2011.01)
*H04L 12/729* (2013.01)

(52) U.S. Cl.
CPC ..... *H04L 67/2814* (2013.01); *H04N 7/17327* (2013.01); *H04N 7/17336* (2013.01)

(58) Field of Classification Search
USPC ........................................ 709/238, 203, 224
See application file for complete search history.

(56) References Cited

U.S. PATENT DOCUMENTS

2007/0025327 A1    2/2007   Raciborski et al.
2010/0250655 A1*  9/2010   Xu ..................... H04N 7/17327
                                                                  709/203

FOREIGN PATENT DOCUMENTS

CN         101702669       5/2010
WO        2004/073269      8/2004

\* cited by examiner

… (1) …

ROUTE DECISION METHOD, CONTENT DELIVERY APPARATUS, AND CONTENT DELIVERY NETWORK INTERCONNECTION SYSTEM

CROSS-REFERENCE TO RELATED APPLICATIONS

This application is a continuation of International Application No. PCT/CN2011/075300, filed on Jun. 3, 2011, which is hereby incorporated by reference in its entirety.

TECHNICAL FIELD

The present invention relates to the field of information technologies, and in particular, to a route decision method, a content delivery apparatus, and a content delivery network interconnection system.

BACKGROUND

A content delivery network (Content Delivery Network, CDN for short) is a network established based on the existing Internet. A content provider (Content Provider, CP for short), based on a CDN, publishes content to a network "edge" closest to a user, so that the user may obtain the desired content nearby, so as to alleviate congestion in a backbone network and improve a response speed. In an actual application, based on factors such as accounting management, a CP is often inclined to subscribe to one CDN service provider rather than subscribe to multiple CDN service providers. Network coverage of any single CDN service provider is limited, but users are scattered in different regions around the world. Therefore, interconnection and interworking need to be achieved between networks of different CDN service providers, so as to share the networks to achieve wider coverage, thereby delivering, to more end users, content of a CP that subscribes to the CDN service providers more end users.

In order to achieve CDN interconnection and interworking, CDNs deployed in different regions by a CDN service provider are interconnected to each other through the Internet to form a CDN interconnection system. In the CDN interconnection system, there is usually a plurality of CDNs capable of providing a service for a same user, interconnection and interworking are achieved between the CDNs; a CDN, closer to a same user for which the CDN is capable of providing a service, for example a user A, is called a downstream CDN (Downstream CDN, DCDN for short), and a CDN farther from the user A is called an upstream CDN (Upstream CDN, UCDN for short). When an upstream CDN receives a user request, the upstream CDN directly forwards the user request to a downstream CDN close to the user. If the downstream CDN cannot provide a service for the user request forwarded by the upstream CDN, the upstream CDN forwards the user request to another downstream CDN close to the user; attempts are made in this way repeatedly, so that the user can obtain a desired content nearby.

In the prior art, when performing a route decision on a to-be-forwarded user request, an upstream CDN determines, through repeated attempts, a downstream CDN that actually can push content to a user, and therefore, the route decision efficiency is low.

SUMMARY

Embodiments of the present invention provide a route decision method, a content delivery apparatus and a content delivery network interconnection system, so as to improve the route decision efficiency of an upstream CDN in a content delivery network interconnection system.

An embodiment of the present invention provides a route decision method, which includes:

receiving a notification message sent by a downstream CDN, where the notification message is used to determine a current service aggregate of services provided by the downstream CDN for an upstream CDN interconnected with the downstream CDN;

determining the current service aggregate according to the notification message; and performing route decision on a to-be-forwarded user request according to the current otal quantity of services and a total service quantity thresholdtotal quantity of services, where the total service quantity thresholdtotal quantity of services is an upper limit, set by the downstream CDN, of services capable of being provided by the downstream CDN for the upstream CDN.

An embodiment of the present invention provides another route decision method, which includes:

generating a notification message, where the notification message is used to determine a current service aggregate of services provided by a downstream CDN for an upstream CDN interconnected with the downstream CDN; and sending the notification message to the upstream CDN, so that the upstream CDN performs route decision on a to-be-forwarded user request with reference to the current service aggregate.

An embodiment of the present invention further provides a content delivery apparatus, and the content delivery apparatus acts as an upstream CDN and includes:

a receiving module, configured to receive a notification message sent by a downstream CDN, where the notification message is used to determine a current service aggregate of services provided by the downstream CDN for the upstream CDN interconnected with the downstream CDN;

a determination module, configured to determine the current service aggregate according to the notification message; and a decision module, configured to, according to the current service aggregate and a total service quantity thresholdtotal quantity of services, perform route decision on a to-be-forwarded user request, where the total service quantity thresholdtotal quantity of services is an upper limit, set by the downstream CDN, of services capable of being provided by the downstream CDN for the upstream CDN.

An embodiment of the present invention further provides another content delivery apparatus, and the content delivery apparatus acts as a downstream CDN and includes:

a generation module, configured to generate a notification message, where the notification message is used to determine a current service aggregate of services provided by a downstream CDN for an upstream CDN interconnected with the downstream CDN; and a sending module, configured to send the notification message to the upstream CDN, so that the upstream CDN performs route decision on a to-be-forwarded user request with reference to the current service aggregate.

An embodiment of the present invention further provides a content delivery network interconnection system, which includes a first CDN and a second CDN, which are respectively an upstream CDN and a downstream CDN that are interconnected.

In the technical solutions provided by the embodiments of the present invention, an upstream CDN determines, according to a notification message sent by a downstream CDN interconnected with the upstream CDN, a current service aggregate of services provided by the downstream CDN for the upstream CDN interconnected to the downstream CDN, and performs route decision on a to-be-forwarded user request according to a current service volume and a total service quantity thresholdtotal quantity of services, which is set by the downstream CDN and capable of being provided by the downstream CDN for the upstream CDN, so as to decrease a probability of forwarding the user request to a downstream CDN incapable of providing a service, thereby improve the accuracy of selecting a downstream CDN for the to-be-forwarded user request, and improve the route decision efficiency.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Sequence numbers of the following embodiments of the present invention are merely for description, but do not represent preference of the embodiments.

Figure 1:
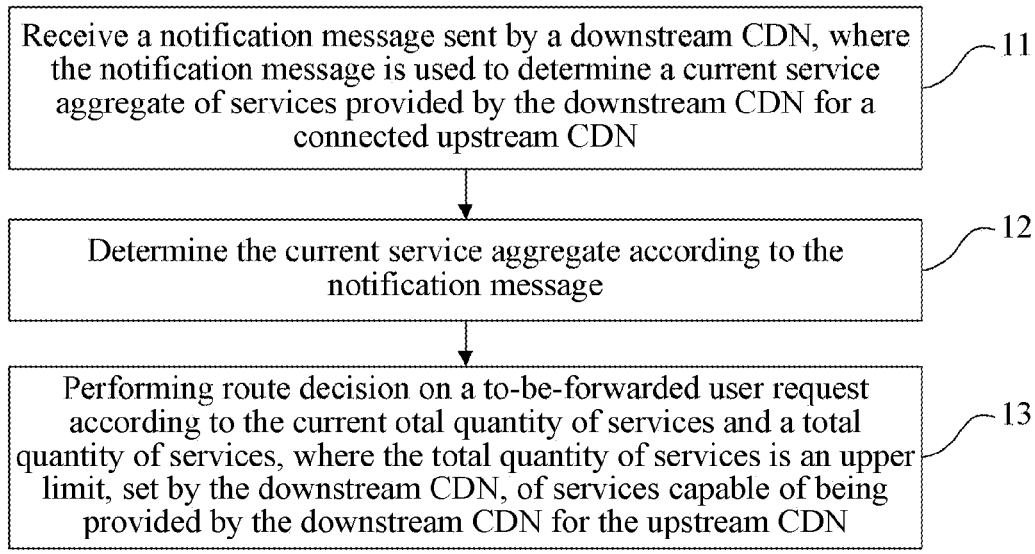
FIG. 1 is a flowchart of a route decision method provided by Embodiment 1 of the present invention.

FIG. 1 is a flowchart of a route decision method provided by Embodiment 1 of the present invention. This embodiment may be executed by an upstream CDN in a CDN interconnection system. As shown in FIG. 1, the route decision method provided by this embodiment includes the following steps.

Step 11: Receive a notification message sent by a downstream CDN, where the notification message is used to determine a current service aggregate of services provided by the downstream CDN for an upstream CDN interconnected to the downstream CDN.

Step 12: Determine the current service aggregate according to the notification message.

Figure 2:
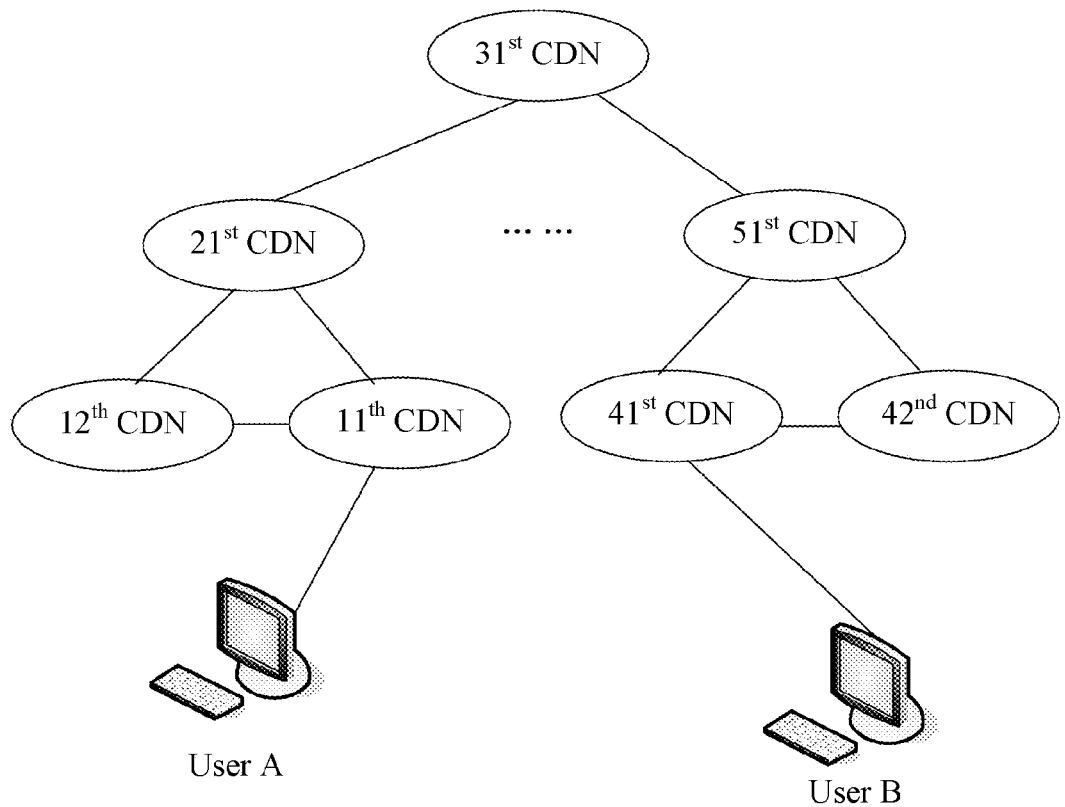
FIG. 2 is a schematic structural diagram of a CDN interconnection system provided by an application scenario of an embodiment of the present invention.

In the embodiment of the present invention, the upstream CDN and the downstream CDN are a relative concept. FIG. 2 is a schematic structural diagram of a CDN interconnection system provided by an application scenario of an embodiment of the present invention. In the CDN interconnection system shown in FIG. 2, an $11^{th}$ CDN and a $21^{st}$ CDN are interconnected, the $21^{st}$ CDN and a $31^{st}$ CDN are interconnected, and the 3 CDNs can all provide a service for a user A. The $11^{th}$ CDN is closer to the user A than the $21^{st}$ CDN, therefore, the $11^{th}$ CDN is a downstream CDN relative to the $21^{st}$ CDN, and is a downstream CDN interconnected with the $21^{st}$ CDN; but, the $21^{st}$ CDN is an upstream CDN relative to the $11^{th}$ CDN, and is an upstream CDN interconnected with the $11^{th}$ CDN. Further, the $21^{st}$ CDN is closer to the user A than the $31^{st}$ CDN, therefore, the $11^{th}$ CDN and the $21^{st}$ CDN each are a downstream CDN relative to the $31^{st}$ CDN; the $31^{st}$ CDN is an upstream CDN relative both to the $11^{th}$ CDN and the $21^{st}$ CDN; and the $21^{st}$ CDN is a downstream CDN interconnected with the $31^{st}$ CDN, and the $31^{st}$ CDN is an upstream CDN interconnected with the $21^{st}$ CDN; and so on. For ease of description, in the embodiment of the present invention, for an upstream CDN and a downstream CDN described in the following, unless otherwise noted, the upstream CDN and the downstream CDN are interconnected, which is not repeated in the following. Further, it can be understood that, the system shown in FIG. 2 is merely an example, and should not be construed as a limit to the technical solution of the embodiment of the present invention.

Specific implementation manners, in which an upstream CDN determines a current service aggregate, are not limited, and may include, for example, that: the upstream CDN collects statistics and records the statistics; or, the downstream CDN collects statistics and reports the statistics, and the upstream CDN records or updates a corresponding result. The two manners are separately described below.

Manner 1: The upstream CDN collects statistics and records the statistics.

In this manner, the notification message may include: reference information used to collect statistics on the current service aggregate. The upstream CDN may collect statistics on and record the current service aggregate according to the reference information.

The reference information may include: identifier information, and start instruction information or stop instruction information. The start instruction information indicates that: the downstream CDN starts providing a service for a user for a user request forwarded by the upstream CDN; the stop instruction information indicates that: the downstream CDN stops providing a service for a user for a user request forwarded by the upstream CDN. The identifier information includes: a CDN identifier of the downstream CDN, or a forwarding identifier allocated by the upstream CDN to the downstream CDN according to a forwarded user request. The current service aggregate includes: a current total quantity of concurrent requests. In the embodiment of the present invention, the current total quantity of concurrent requests is the total number of user requests forwarded by the upstream CDN and currently received by the downstream CDN. When the upstream CDN collects statistics on the current total quantity of concurrent requests, the upstream CDN may execute an add-1 operation for the start instruction information or execute a deduct-1 operation for the stop instruction information on the currently recorded current total quantity of concurrent requests of the downstream CDN corresponding to the identifier information, and update a currently recorded corresponding result.

The reference information may also include: the foregoing identifier information and single traffic. The single traffic is traffic occupied by the downstream CDN to provide a service for a user for a user request currently forwarded by the upstream CDN. The current service aggregate includes current total amount of concurrent traffic. In the embodiment of the present invention, the current total amount of concurrent traffic is a sum of traffic occupied by user requests forwarded by the upstream CDN and currently received by the downstream CDN. When the upstream CDN collects statistics on the current total amount of concurrent traffic, the upstream CDN may execute an operation of adding or deducting the single traffic on the currently recorded current total amount of concurrent traffic of the downstream CDN corresponding to the identifier information, and update a currently recorded corresponding result.

In addition, the reference information may further include: a protocol type used by the downstream CDN to provide a service for a user for a user request currently forwarded by the upstream CDN; the total service quantity thresholdtotal quantity of services may further include: a current total concurrent request quantity threshold and/or a current total concurrent traffic amount threshold of each protocol type. The reference information may further include: a domain name of a content provider for a content requested by a user request currently forwarded by the upstream CDN; the total service quantity thresholdtotal quantity of services may further include: a current total concurrent request quantity threshold and/or a current total concurrent traffic amount threshold corresponding to each content provider domain name. Therefore, when the upstream CDN collects statistics on the current total quantity of concurrent requests, the upstream CDN may separately collect statistics on the current total quantity of concurrent requests and/or the current total amount of concurrent traffic according to the protocol type and/or the domain name of the content provider.

Manner 2: The downstream CDN collects statistics and reports the statistics, and the upstream CDN records or updates a corresponding result.

In this case, the notification message may include: identifier information and the current service aggregate; the identifier information includes a CDN identifier of the downstream CDN, or a forwarding identifier allocated by the upstream CDN to the downstream CDN according to a forwarded user request. The upstream CDN records or updates a corresponding result corresponding to the identifier information according to the current service aggregate carried by the notification message.

Step 13: According to the current service aggregate and the total service quantity thresholdtotal quantity of services, perform route decision on a to-be-forwarded user request, where the total service quantity thresholdtotal quantity of services is an upper limit, set by the downstream CDN, of services capable of being provided by the downstream CDN for the upstream CDN.

The current service aggregate determined by the upstream CDN may include: the current total quantity of concurrent requests and/or the current total amount of concurrent traffic of services provided by the downstream CDN for the upstream CDN interconnected with the downstream CDN, and may further include: the current total quantity of concurrent requests and/or the current total amount of concurrent traffic on which statistics is separately collected according to the protocol type or the domain name of the content provider.

The total service quantity thresholdtotal quantity of services may include one of or a combination of: a total concurrent request quantity threshold; a total concurrent traffic amount threshold; a total concurrent request quantity threshold and/or a total concurrent traffic amount threshold of each protocol type; a total concurrent request quantity threshold and/or a total concurrent traffic amount threshold corresponding to each content provider domain name. The total service quantity thresholdtotal quantity of services may be preconfigured on the upstream CDN. Alternatively, the total service quantity thresholdtotal quantity of services may be carried in the notification message, and reported by the downstream CDN to the upstream CDN, so that the downstream CDN notifies the upstream CDN in time after the total service quantity thresholdtotal quantity of services is changed, thereby improving application flexibility.

When an upstream CDN receives a user request, if it is found that a downstream CDN close to a user corresponding to the user request exists in the system, the upstream CDN performs route decision with reference to a current service aggregate of the downstream CDN, which is most recently recorded by the upstream CDN, and a total service quantity thresholdtotal quantity of services. For example:

When the current service aggregate determined by the upstream CDN is the current total quantity of concurrent requests and the total service quantity thresholdtotal quantity of services is the total concurrent request quantity threshold, the upstream CDN compares the current total quantity of concurrent requests recorded by the upstream CDN with the total concurrent request quantity threshold, and if the current total quantity of concurrent requests is less than the total concurrent request quantity threshold, forwards the user request to the downstream CDN; otherwise, the upstream CDN does not forward the user request to the downstream CDN.

When the current service aggregate determined by the upstream CDN is the current total amount of concurrent traffic and the total service quantity thresholdtotal quantity of services is the total concurrent traffic amount threshold, the upstream CDN compares the current total amount of concurrent traffic recorded by the upstream CDN with the total concurrent traffic amount threshold, and if the current total amount of concurrent traffic is less than the total concurrent traffic amount threshold, forwards the user request to the downstream CDN. If the current total amount of concurrent traffic is greater than or equal to the total concurrent traffic amount threshold, the upstream CDN does not forward the user request to the downstream CDN.

In the case that the upstream CDN does not forward the user request to the downstream CDN, the upstream CDN may provide a service for a user corresponding to the user request, may also select another forwarding route for the user request, and so on.

Definitely, in an actual application, the upstream CDN may collect, together or separately, statistics on the current total quantity of concurrent requests and the current total amount of concurrent traffic, and perform route decision on a to-be-forwarded route request with reference to a statistical result, so as to improve the route decision accuracy, and thereby improve the route decision efficiency.

In the route decision method provided by this embodiment, the upstream CDN determines, according to the notification message sent by the downstream CDN interconnected with the upstream CDN, the current service aggregate of services provided by the downstream CDN for the upstream CDN interconnected to the downstream CDN, and performs route decision on a to-be-forwarded user request according to the current service aggregate and the total service quantity thresholdtotal quantity of services, which is set by the downstream CDN, capable of being provided by the downstream CDN for the upstream CDN, so as to decrease a probability of forwarding the user request to a downstream CDN incapable of providing a service, thereby improve the accuracy of selecting a downstream CDN for the to-be-forwarded user request, and improve the route decision efficiency.

Figure 3:
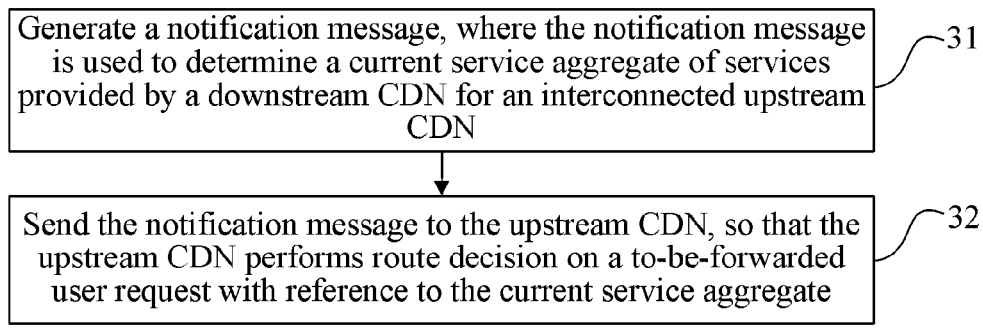
FIG. 3 is a flowchart of a route decision method provided by Embodiment 2 of the present invention.

FIG. 3 is a flowchart of a route decision method provided by Embodiment 2 of the present invention. This embodiment may be executed by a downstream CDN in a CDN interconnection system. As shown in FIG. 3, the route decision method provided by this embodiment includes the following steps.

Step 31: Generate a notification message, where the notification message is used to determine a current service aggregate of services provided by a downstream CDN for an upstream CDN interconnected with the downstream CDN.

The type of the notification message is not limited, and information carried therein may include: reference information used to collect statistics on the current service aggregate; or, identifier information and the statistically counted current service aggregate. Description is separately provided below for the technical solutions corresponding to the two different types of parameters carried in the notification message.

Manner 1: The notification message includes: reference information used to collect statistics on the current service aggregate.

In this case, the reference information may include: identifier information and at least one of the following information: start instruction information, stop instruction information, and single traffic. The identifier information may include: a CDN identifier of the downstream CDN, or a forwarding identifier allocated by the upstream CDN to the downstream CDN according to a forwarded user request. The start instruction information indicates that: the downstream CDN starts providing a service for a user for a user request forwarded by the upstream CDN. The stop instruction information indicates that: the downstream CDN stops providing a service for a user for a user request forwarded by the upstream CDN. The single traffic is traffic occupied by the downstream CDN to provide a service for a user for a user request currently forwarded by the upstream CDN.

The reference information may further include at least one of the following information: a protocol type used by the downstream CDN to provide a service for a user request currently forwarded by the upstream CDN; a domain name of a content provider for a content requested by a user request currently forwarded by the upstream CDN.

Manner 2: The notification message includes: identifier information and the statistically counted current service aggregate.

The identifier information may include: a CDN identifier of the downstream CDN, or a forwarding identifier allocated by the upstream CDN to the downstream CDN according to a forwarded user request.

In this case, before the downstream CDN generates the notification message, the method further includes: collecting statistics on the current service aggregate of the downstream CDN.

The current service aggregate may include a current total quantity of concurrent requests and/or a current total amount of concurrent traffic.

A method for the downstream CDN to collect statistics on the current total quantity of concurrent requests may include: when the downstream CDN starts providing a service for a user for a user request forwarded by the upstream CDN, executing an add-1 operation on the currently recorded current total quantity of concurrent requests, and updating a currently recorded corresponding result; when the downstream CDN stops providing the service for the user for a user request forwarded by the upstream CDN, executing a deduct-1 operation on the currently recorded current total quantity of concurrent requests, and updating the currently recorded corresponding result.

A method for the downstream CDN to collect statistics on the current total amount of concurrent traffic may include: when the downstream CDN starts providing a service for a user for a user request forwarded by the upstream CDN, executing an add-single-traffic operation on the currently recorded current total amount of concurrent traffic, and updating a currently recorded corresponding result; when the downstream CDN stops providing the service for the user for a user request forwarded by the upstream CDN, executing a deduct-single-traffic operation on the currently recorded current total amount of concurrent traffic, and updating the currently recorded corresponding result. The single traffic is traffic occupied by a service provided for a user for a user request currently forwarded by the upstream CDN.

When the downstream CDN collects statistics on the current total quantity of concurrent requests and/or the current total amount of concurrent traffic, the downstream CDN may separately collect statistics on the current total quantity of concurrent requests and/or the current total amount of concurrent traffic according to a protocol type used by the downstream CDN to provide a service for a user for a user request currently forwarded by the upstream CDN and/or a domain name of a content provider for a requested content.

The generated notification message may further include: a total service quantity thresholdtotal quantity of services. The total service quantity thresholdtotal quantity of services includes one of or any combination of: a total concurrent request quantity threshold; a total concurrent traffic amount threshold; a total concurrent request quantity threshold and/or a total concurrent traffic amount threshold of each protocol type; a total concurrent request quantity threshold and/or a total concurrent traffic amount threshold corresponding to each content provider domain name.

Step 32: Send the notification message to the upstream CDN, so that the upstream CDN performs route decision on a to-be-forwarded user request with reference to the current service aggregate.

The downstream CDN may select a timing satisfying certain conditions to generate the notification message and send it to the upstream CDN. The timing may specifically be:

Timing 1: the moment when the downstream CDN starts or stops providing a service for a user for a user request forwarded by the upstream CDN. The downstream CDN generates a notification message at the timing, and sends it to the upstream CDN, so as to report in real time or collect statistics in real time on data of the downstream CDN, and update in real time data obtained by the upstream CDN, resulting in good real-time quality of data thereof.

Timing 2: The end of each preset duration, where the preset duration is used as a cycle. For example: the downstream CDN may collect statistics on the current service aggregate at the timing 1, and regularly report a statistical result at the timing 2, so as to facilitate reduction in interaction between the downstream CDN and the upstream CDN, and reduce signaling overhead, thereby facilitating improvement of overall performance of the system.

For an implementation method, in which the upstream CDN receives the notification message sent by the downstream CDN, determines the current service aggregate according to the notification message, and performs route decision on the to-be-forwarded user request with reference to the current service aggregate, reference may be made to the description of the embodiment corresponding to FIG. 1, which is not repeated herein.

In the route decision method provided by this embodiment, the downstream CDN generates the notification message, including the reference information used to collect statistics on the current service aggregate, or including the identifier information and the statistically counted current service aggregate, and sends the notification message to the upstream CDN, so that the upstream CDN may perform route decision on the to-be-forwarded user request with reference to the current service aggregate, so as to improve the accuracy of the upstream CDN in selecting a downstream CDN for the to-be-forwarded user request, and thereby improve the route decision efficiency.

Figure 4:
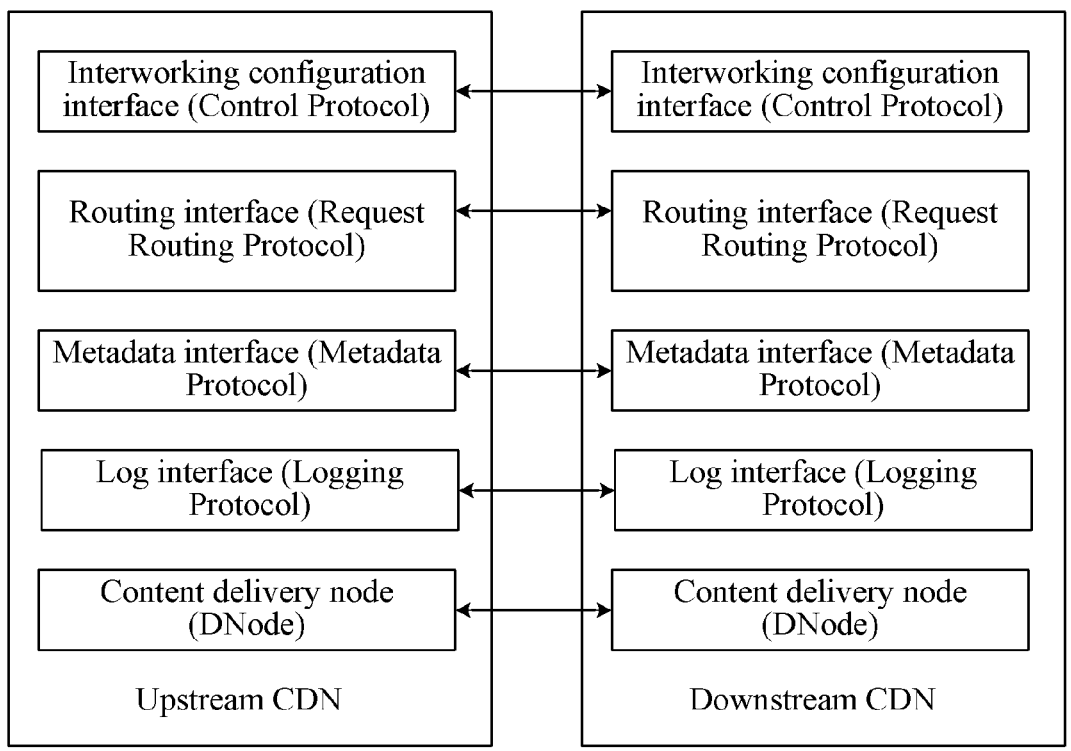
FIG. 4 is a schematic diagram of a logical interface model for interworking between upstream and downstream CDNs in an application scenario according to an embodiment of the present invention.

FIG. 4 is a schematic diagram of a logical interface model for interworking between upstream and downstream CDNs in an application scenario according to an embodiment of the present invention. Between a pair of interworking CDNs formed by an upstream CDN and a downstream CDN, communication may be performed by adopting the following interfaces, and the interfaces are defined below.

Interworking configuration interface (Control Protocol): an interface used by an upstream CDN to send, to a downstream CDN, commands such as Delete and Make-Content-Invalid.

Routing interface (Request Routing Protocol): through the interface, an upstream CDN forwards a user request to a downstream CDN; a downstream CDN reports information required by route decision through the interface, for example, reports the notification message and so on described in the embodiment of the present invention.

Metadata interface (Metadata Protocol): through the interface, interworking upstream and downstream CDNs exchange some content delivery policy information, region information of a content, for example, the content is not allowed to be delivered in some regions, and information on an available time window of a content and so on.

Log interface (Logging Protocol): through the interface, interworking upstream and downstream CDNs exchange log-related information, for example, the downstream CDN reports, to the upstream CDN through the interface, an amount of traffic for a content, which the downstream CDN delivers in a certain time period to a certain user for the upstream CDN, and so on.

In addition, a node providing content delivery (Delivery Node, DN for short) is further included between interworking upstream and downstream CDNs: the interworking upstream and downstream CDNs exchange contents related to a user request through the DN.

It can be understood that, the interface model shown in FIG. 4 is merely an example, and should not be construed as a limit to the technical solution of the embodiment of the present invention.

The technical solution of the embodiment of the present invention is described below in detail with reference to the logical interface model for interworking between upstream and downstream CDNs and with reference to specific scenarios shown in FIG. 5A to FIG. 7B. In the following embodiments corresponding to FIG. 5A to FIG. 7B, a CDNA and a CDNB form a pair of interconnected and interworking CDNs, the CDNA is an upstream CDN of the CDNB, CDNB is a downstream CDN of the CDNA; the CDNA is farther from a user terminal A, subscribes to a content provider, and is closer to an origin server (Origin Server), and the CDNB is closer to the user terminal A, but is farther from the origin server (Origin Server). The CDNA may include: a routing interface module (CDNA&RR) and a content delivery node (CDNA DN) of the CDNA; the CDNB may include: a routing interface module (CDNB&RR) and a content delivery node (CDNB DN) of the CDNB.

Figure 5A:
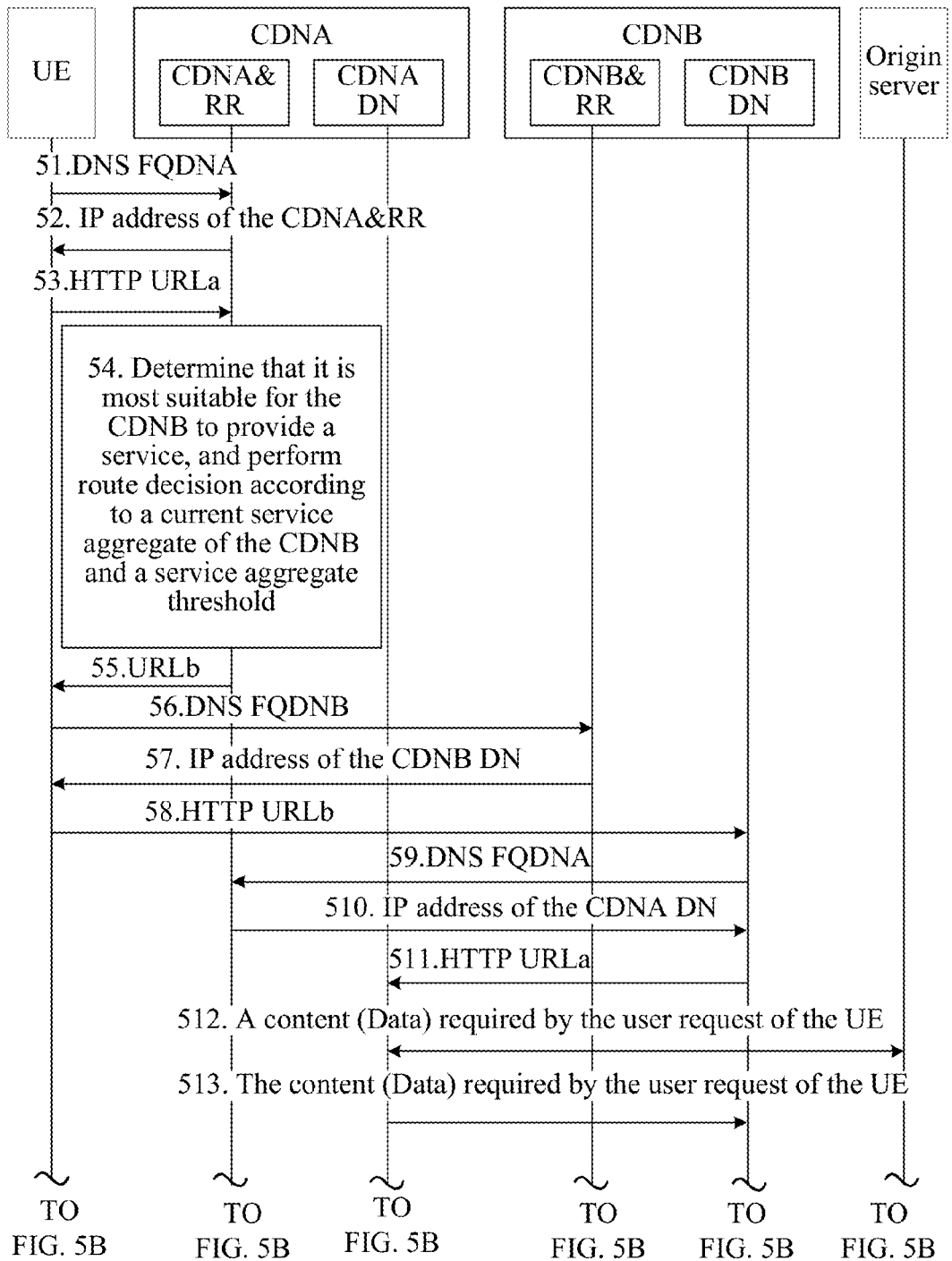
FIG. 5A and FIG. 5B are a signaling exchange diagram of a route decision method provided by Embodiment 3 of the present invention.
Figure 5B:
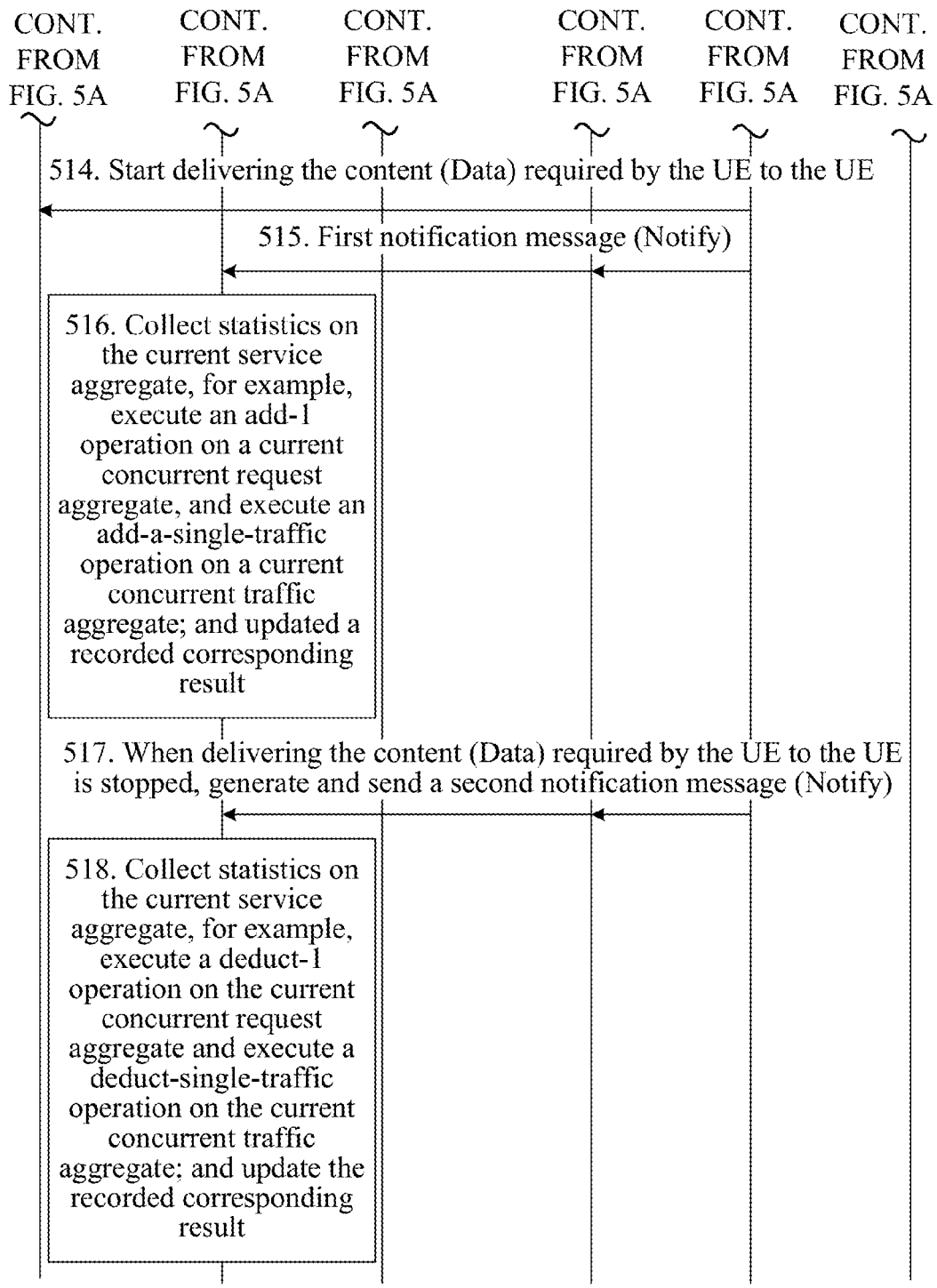

FIG. 5A and FIG. 5B are a signaling exchange diagram of a route decision method provided by Embodiment 3 of the present invention. In this embodiment, an upstream CDN, that is the CDNA, collects statistics on and records a current service aggregate of the CDNB in real time according to a notification message sent by a downstream CDN, that is, the CDNB. As shown in FIG. 5A and FIG. 5B, the route decision method provided by this embodiment includes the following steps.

Step 51: An end user (End User) sends a domain name server (Domain Name Server, DNS for short) query request (DNS FQDNA) to the CDNA&RR through a user equipment (User Equipment, UE for short).

Step 52: The CDNA&RR judges, according to information such as a user location, that it is most suitable for the CDNB to provide a service for the UE, and the CDNA&RR returns its IP address to the UE so that a redirection mechanism of HTTP can be subsequently used.

Step 53: The UE sends an HTTP request (HTTP URLa) to the IP address returned in step 52.

Step 54: The CDNA&RR receives the HTTP request sent by the UE, judges again, according to user location information, that it is most suitable for the CDNB to provide a service for the UE, and therefore performs route decision according to the current service aggregate and a total service quantity thresholdtotal quantity of services of the CDNB, whether to forward the HTTP request to the CDNB.

It is assumed that the current service aggregate of the CDNB is: a current total quantity of concurrent requests and a current total amount of concurrent traffic of the CDNB, and the total service quantity thresholdtotal quantity of services is specifically a total concurrent request quantity threshold and a total concurrent traffic amount threshold, so that when the CDNA&RR performs route decision, the CDNA&RR compares a current total quantity of concurrent requests and a current total amount of concurrent traffic, recorded by the CDNA&RR, with the total concurrent request quantity threshold and the total concurrent traffic amount threshold respectively. If the current total quantity of concurrent requests is less than the total concurrent request quantity threshold and the current total amount of concurrent traffic is less than the total concurrent traffic amount threshold, determine that the user request may be forwarded to the CDNB, so that the CDNB subsequently provides a service for the UE, and executes step 55; otherwise, the CDNA&RR selects another downstream CDN to forward the user request.

Step 55: The CDNA&RR returns a URL address (URLb) of the CDNB&RR to the UE, to notify the UE of establishing a connection with the CDNB according to the URL address.

Step 56: The UE sends a DNS query request (DNS FQDNB) to the CDNB&RR.

Step 57: The CDNB&RR selects, based on information such as UE location information and a domain name of a CP of a content requested by the request, a node CDNB DN that finally delivers the content to the UE, and returns an IP address of the CDNB DN to the UE.

Step 58: The UE sends an HTTP request (HTTP URLb) to the CDNB DN.

Step 59: Upon receiving an HTTP content request, if the CDNB DN finds that the CDNB DN does not have the content required by the request, the CDNB DN sends a DNS query request (DNS FQDNA) to the CDNA&RR.

Step 510: The CDNA&RR selects a content delivery node, that is the CDNA DN, and returns an IP address of the CDNA DN to the CDNB DN.

Step 511: The CDNB DN sends an HTTP request (HTTP URLa) to the CDNA DN, so as to request to obtain the content required by the user request of the UE.

Step 512: If the CDNA DN does not store the content required by the user request of the UE, the CDNA DN obtains the content (Data) required by the user request of the UE from the origin server of the CP.

Step 513: The CDNA DN sends the content required by the user request of the UE to the CDNB DN.

Step 514: The CDNB DN starts delivering the content (Data) required by the UE to the UE.

Step 515: When the CDNB DN starts delivering the content to the UE for the user request forwarded by the CDNA, generate a notification message (Notify), called a first notification message herein, and send the first notification message to the CDNA&RR through the CDNB&RR.

Step 515 may be executed in parallel with step 514.

The first notification message may carry: a CDN identifier of the CDNB, start service instruction information, and single traffic. The first notification message may further carry at least one of the following information: a protocol type, such as HTTP and RTP, used by the CDNB to deliver the content to the UE for the user request forwarded by the CDNA; the domain name, such as "video.sina.com", of the CP of the content delivered by the CDNB to the UE for the user request forwarded by the CDNA, and so on. Further, the first notification message may further carry at least one of the following information: a total concurrent request quantity threshold, a total concurrent traffic amount threshold, a total concurrent request quantity threshold and a total concurrent traffic amount threshold of each protocol type, and a total concurrent request quantity threshold and a total concurrent traffic amount threshold corresponding to each content provider domain name, which are set by a CDNB administrator. For example, a total concurrent request quantity threshold of the RTP is 8, a total concurrent request quantity threshold of the HTTP is 20, the total concurrent request quantity threshold is 100, the total concurrent traffic amount threshold is 500M, a total concurrent traffic amount threshold occupied by RTP delivery is 100M, a total concurrent traffic amount threshold occupied by HTTP delivery is 300M, and so on.

Step 516: The CDNA&RR receives the first notification message, and collects statistics on and records the current service aggregate of the CDNB according to the first notification message, for example, collects statistics on user requests forwarded by the CDNB for the CDNA, the current total quantity of concurrent requests for providing the service, and the current total amount of concurrent traffic, and updates a recorded corresponding result.

The CDNA&RR may search, in locally recorded data, for the current total quantity of concurrent requests and the current total amount of concurrent traffic of the CDN corresponding to the CDN identifier carried in the first notification message, execute an add-1 operation on the recorded current total quantity of concurrent requests, execute an add-the-single-traffic operation on the recorded current total amount of concurrent traffic according to the single traffic carried in the first notification message for start instruction information carried in the notification message, and update a local corresponding recorded result.

The CDNA&RR may further separately collect statistics on the current total quantity of concurrent requests and the current total amount of concurrent traffic of the CDNB according to the protocol type and the domain name information carried in the first notification message. For example, the CDNA&RR statistically obtains the current total quantity of concurrent requests of the CDNB, which is 5, among which 3 are delivered by using an RSTP protocol type and 2 are delivered through an RTP protocol type, where among 3 concurrent requests delivered by using the RSTP protocol type, 2 are contents published by "sina", and 1 is a content published by "youtube", and separately collect statistics on the corresponding total amount of concurrent traffic.

Step 517: When the CDNB DN stops delivering the content (Data) to the UE for the user request forwarded by the CDNA, generate a notification message (Notify), called a second notification message herein, and send the second notification message to the CDNA&RR through the CDNB &RR.

The second notification message may carry: a CDN identifier of the CDNB, stop service instruction information, and single traffic. The second notification message may further carry at least one of the following information: a protocol type, such as HTTP and RTP, used by the CDNB to deliver the content to the UE for the user request forwarded by the CDNA; the domain name, such as "video.sina.com", of the CP of the content delivered by the CDNB to the UE for the user request forwarded by the CDNA, and so on.

Step 518: The CDNA&RR receives the second notification message, and collects statistics on and records the current service aggregate of the CDNB according to the second notification message, that is, collects statistics on user requests forwarded by the CDNB for the CDNA, the current total quantity of concurrent requests for providing the service, and the current total amount of concurrent traffic, and updates a recorded corresponding result.

The CDNA&RR may search, in locally recorded data, for the current total quantity of concurrent requests and the current total amount of concurrent traffic, which are recorded, of the CDN corresponding to the CDN identifier carried in the second notification message, execute a deduct-1 operation on the locally recorded current total quantity of concurrent requests, execute a deduct-the-singletraffic operation on the recorded current total amount of concurrent traffic according to the single traffic carried in the second notification message for stop instruction information carried in the second notification message, and update a locally recorded corresponding result. In the case that the CDNA&RR separately collects statistics, it is further required to execute a corresponding deduct-1 or deduct-the-single-traffic operation on the recorded statistical data, and update the locally recorded corresponding result.

In the route decision method provided by this embodiment, the CDNB sends the notification message to the CDNA, the notification message carries the reference information required for determining the current total quantity of concurrent requests and the current total amount of concurrent traffic when the CDNB provides the service for the CDNA, the CDNB collects statistics on and updates the locally recorded corresponding result according to the reference information, and performs route decision on a to-be-forwarded user request according to the locally recorded latest result, so as to decrease a probability of forwarding the user request to a downstream CDN incapable of providing the service, improve the accuracy of the route decision thereof, and thereby improve the route decision efficiency.

Figure 6A:
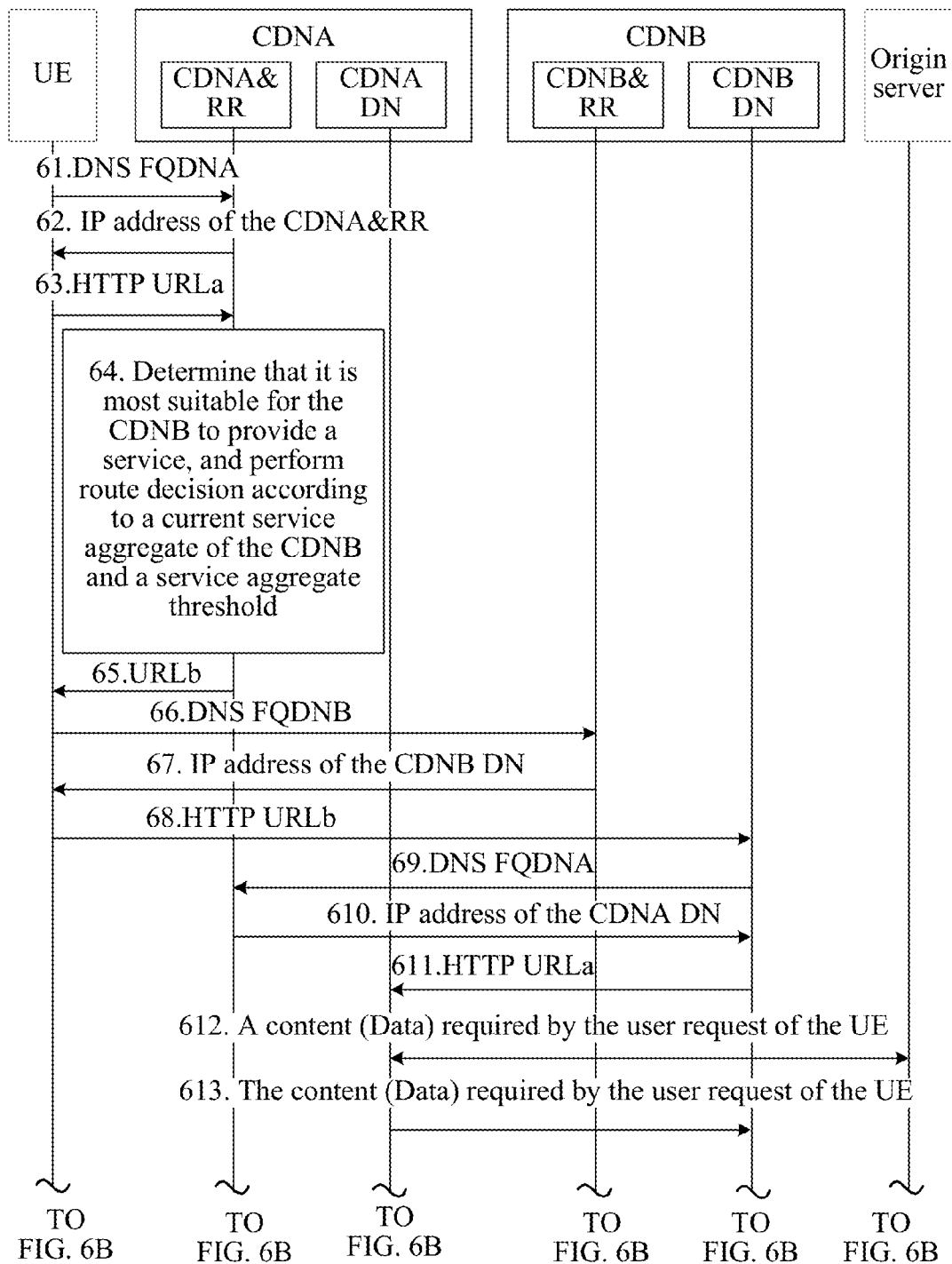
FIG. 6A and FIG. 6B are a signaling exchange diagram of a route decision method provided by Embodiment 4 of the present invention.
Figure 6B:
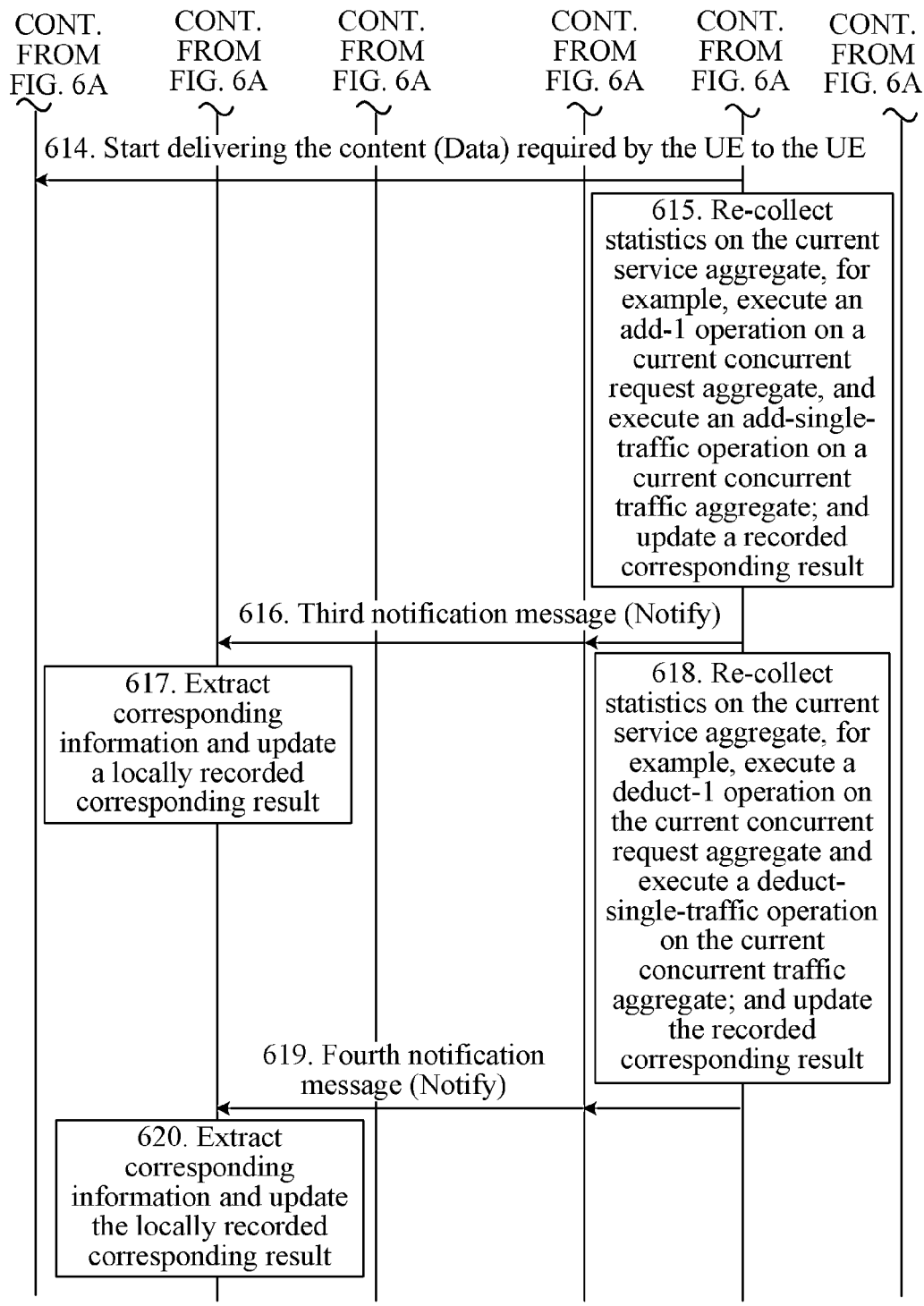

FIG. 6A and FIG. 6B are a signaling exchange diagram of a route decision method provided by Embodiment 4 of the present invention. In this embodiment, a downstream CDN, that is the CDNB, collects statistics in real time on a current service aggregate of services provided by the downstream CDN for an upstream CDN, that is the CDNA, and reports the current service aggregate to the CDNA. As shown in FIG. 6A and FIG. 6B, the route decision method provided by this embodiment includes the following steps.

Step 61 to step 614 are similar to step 51 to step 514, and are not repeated herein.

Step 615: When the CDNB DN starts delivering the content to the UE for the user request forwarded by the CDNA, the CDNB DN re-collects statistics on the current service aggregate.

Step 615 may be executed in parallel with step 614.

The current service aggregate of the CDNB may include: a current total quantity of concurrent requests and a current total amount of concurrent traffic of the CDNB. When the CDNB DN starts delivering the content required by the user request to the UE, the CDNB&RR may execute an add-1 operation on the locally recorded current total quantity of concurrent requests of services provided for the CDNA, execute an add-the-single-traffic operation on the locally recorded current total amount of concurrent traffic of the serviced provided for the CDNA, and update a locally recorded corresponding result.

Further, the CDNB may further judge a protocol type used by the delivery of the content of the UE, and separately collect statistics on the current total quantity of concurrent requests and the current total amount of concurrent traffic according to the protocol type. For example:

If the protocol type used by the content delivery is HTTP, the CDNB adds 1 to the current HTTP total quantity of concurrent requests of the services currently provided for the CDNA, and adds single traffic to the current HTTP total amount of concurrent traffic of the services currently provided for the CDNA. Further, the CDNB may further judge a domain name of a content provider for the delivered content, and separately collect statistics on the current total quantity of concurrent requests and the current total amount of concurrent traffic according to the domain name. For example, if the domain name of the content provider for the delivered content is "Youtube", the CDNB adds 1 to the current total quantity of concurrent requests of services currently provided for the CDNA with the content provider domain name being "Youtube", and performs an incremental operation on the current total amount of concurrent traffic of services currently provided for "Youtube", and an increment is traffic required to be occupied by the CDNB for the content delivery.

Step 616: The CDNB DN generates a notification message (Notify), called a third notification message herein, and sends the third notification message to the CDNA&RR through the CDNB &RR.

The third notification message may carry: a CDN identifier of the CDNB, and the current total quantity of concurrent requests and the current total amount of concurrent traffic of the CDNB.

The third notification message may further carry: the current total quantity of concurrent requests and the current total amount of concurrent traffic of each kind, on which the CDNB separately collects statistics according to the protocol type or the domain name of the CP.

The third notification message may further carry at least one of the following information: a total concurrent request quantity threshold, a total concurrent traffic amount threshold, a total concurrent request quantity threshold and a total concurrent traffic amount threshold of each protocol type, a total concurrent request quantity threshold and a total concurrent traffic amount threshold corresponding to each content provider domain name, which are set by a CDNB administrator. For example: the total concurrent requests quantity threshold is 500, the total concurrent traffic amount threshold is 1000M, the total concurrent request quantity threshold of the RTP is 100 and the total concurrent traffic amount threshold thereof is 200M, the total concurrent request quantity threshold of the content provider domain name being "Youtube" is 400 and the total concurrent traffic amount threshold thereof is 800M, and so on.

Step 617: Upon receiving the third notification message, the CDNA&RR extracts corresponding information and updates a locally recorded corresponding result, and upon arrival of a next user request, re-executes the route decision in step 64 according to the extracted information.

The information extracted by the CDNA&RR from the third notification message may include: the current total quantity of concurrent requests and the current total amount of concurrent traffic statistically obtained by the CDNB; and may further include at least one of the following information: the current total quantity of concurrent requests and the current total amount of concurrent traffic of each kind, the total concurrent request quantity threshold, the total concurrent traffic amount threshold, and the total concurrent request quantity threshold and the total concurrent traffic amount threshold of each kind.

Step 618: When the CDNB DN stops delivering the content to the UE for the user request forwarded by the CDNA, the CDNB DN re-collects statistics on the current service aggregate.

Upon sensing that the delivery of the content by the CDNB DN to the UE stops, the CDNB DN may execute a deduct-1 operation on the current total quantity of concurrent requests locally recorded by the CDNB, and execute a deduct-single-traffic operation on the locally recorded current total amount of concurrent traffic. Then, the CDNB updates a locally recorded corresponding result. The CDNB may further separately collect statistics according to the protocol type required by the delivery of the content to the UE and the domain name of the CP of the content, and update the locally recorded corresponding result.

Step 619: The CDNB DN generates a notification message (Notify), called a fourth notification message herein, and sends the fourth notification message to the CDNA&RR through the CDNB&RR.

The fourth notification message may carry: a CDN identifier of the CDNB, and the current total quantity of concurrent requests and the current total amount of concurrent traffic of the CDNB.

The fourth notification message may further carry: the current total quantity of concurrent requests and the current total amount of concurrent traffic of each kind, on which the CDNB separately collects statistics according to the protocol type or the domain name of the CP.

Step 620: Upon receiving the fourth notification message, the CDNA&RR extracts corresponding information and updates a locally recorded corresponding result, and upon arrival of a next user request, re-executes the route decision in step 64 according to the extracted information.

In the route decision method provided by this embodiment, the CDNB sends the notification message, including the result statistically counted by the CDNB in real time, to the CDNA, so that the CDNA extracts the statistical result from the notification message and updates the locally recorded corresponding result. The CDNA may perform route decision on a to-be-forwarded user request according to the locally recorded latest result, so as to decrease a probability of forwarding the user request to a downstream CDN incapable of providing the service, improve the accuracy of the route decision thereof, and thereby improve the route decision efficiency.

Alternatively, a variation may be made to partial technical means of this embodiment, and act as another implementation manner of the present invention. For example: the CDNB, that is the downstream CDN, still internally collects statistics in real time on the current total quantity of concurrent requests and the current total amount of concurrent traffic of services provided for the upstream CDN, but does not send a notification message to the upstream CDN after each statistical operation, that is, step 616 and step 619 in this embodiment are not executed; instead, the CDNB, using a preset duration as a cycle, regularly sends a statistical result of the moment corresponding to the end of each preset duration to the upstream CDN, and the statistical result may be carried in the notification message. The timing duration may be specified by the upstream CDN, that is, the CDNA, may also be set through the downstream CDN by the CDNB administrator, and so on. Upon receiving the notification message sent regularly by the CDNB, the CDNA extracts the information carried by the notification message and updates the locally recorded corresponding result. The downstream CDN, that is the CDNB, adopts the regular reporting manner to notify the upstream CDN, that is, the CDNA, so as to reduce signaling exchange between the CDNA and the CDNB, reduce signaling overhead, and thereby facilitate improvement of overall performance of the system.

Figure 7A:
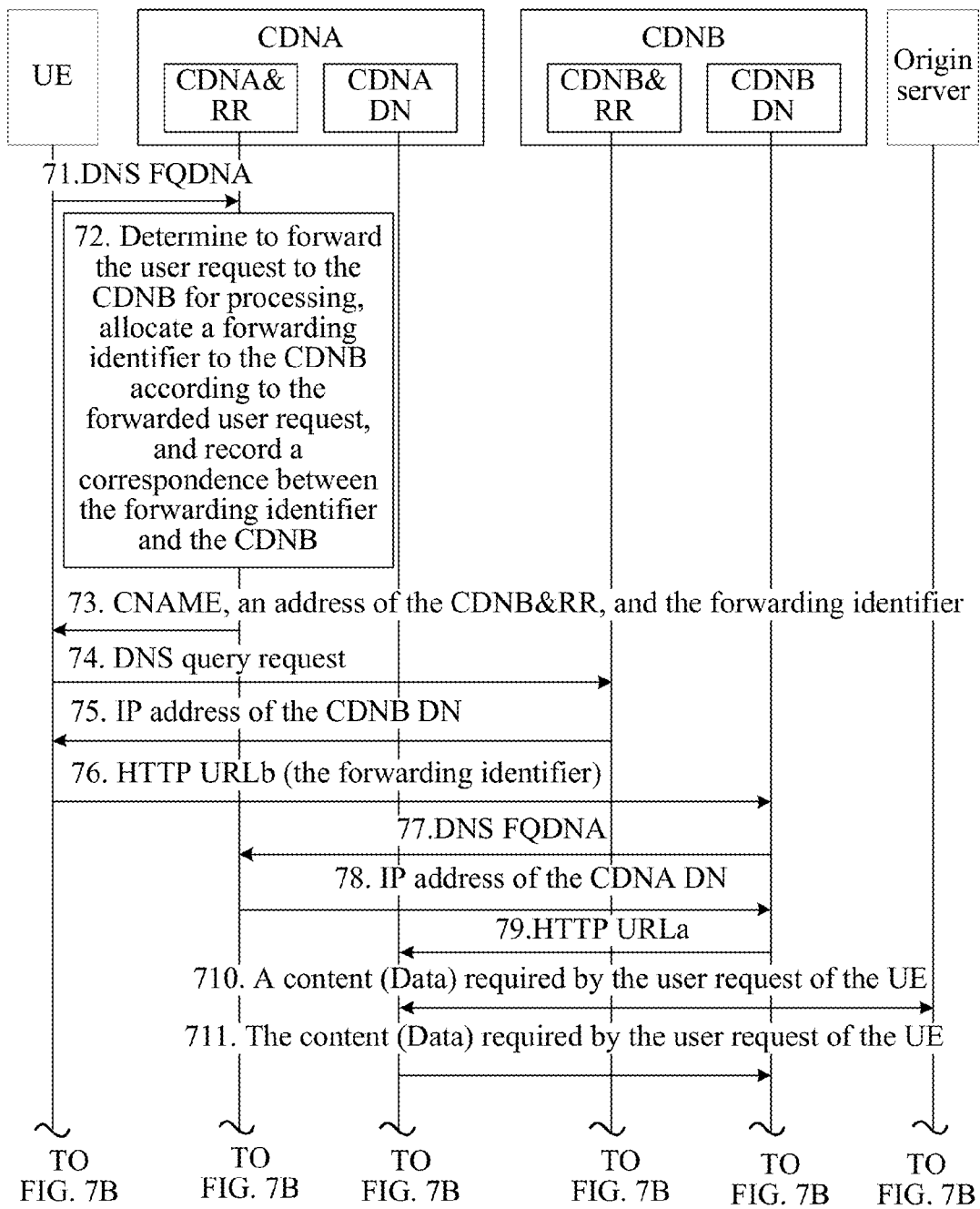
FIG. 7A and FIG. 7B are a signaling exchange diagram of a route decision method provided by Embodiment 5 of the present invention.
Figure 7B:
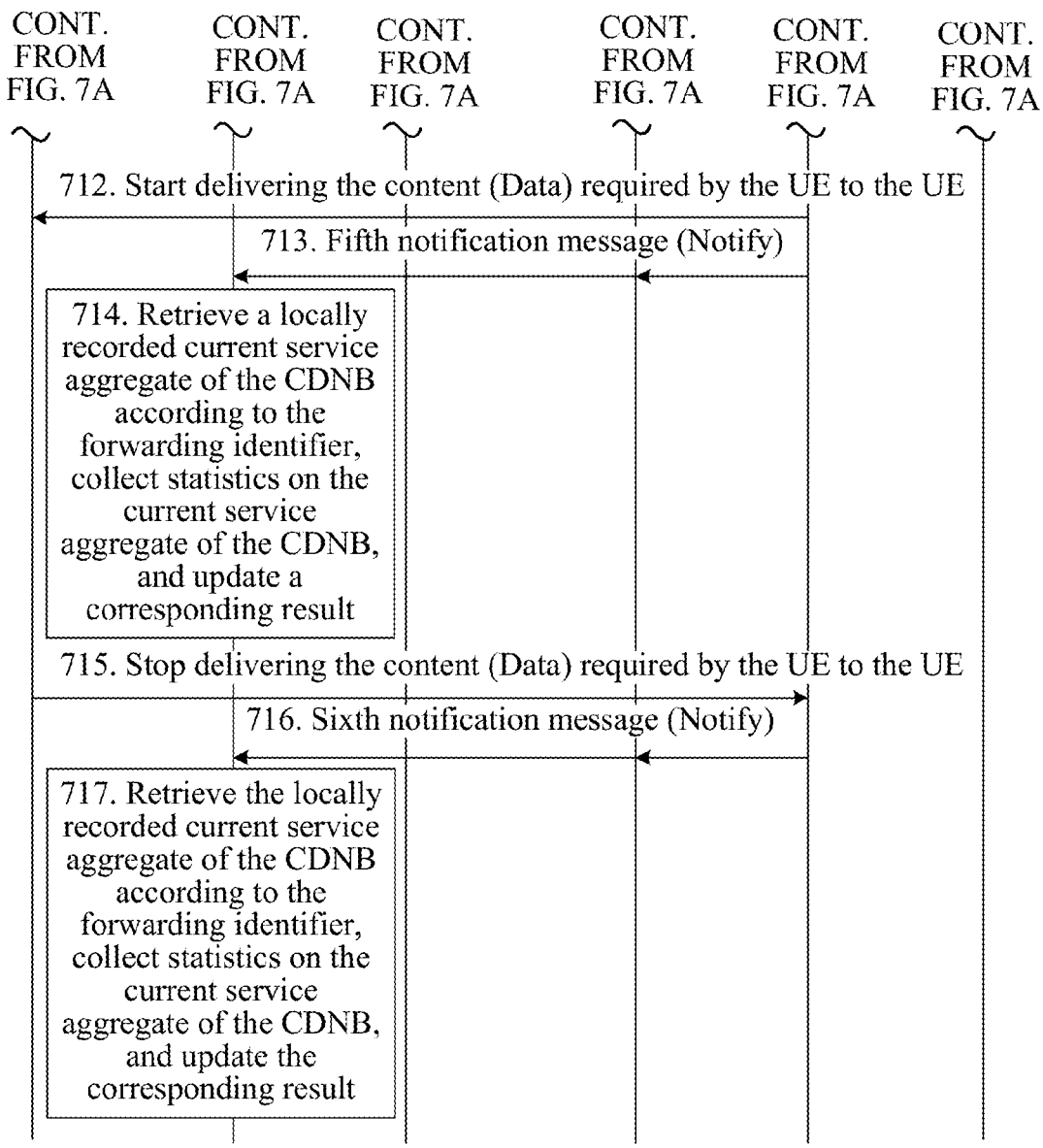

FIG. 7A and FIG. 7B are a signaling exchange diagram of a route decision method provided by Embodiment 5 of the present invention. In this embodiment, when an upstream CDN, that is, the CDNA, forwards a user request to a downstream CDN, that is, the CDNB, the CDNA allocates a forwarding identifier to the CDNB according to the forwarded user request, and subsequently, upon sensing start or stop of content delivery, the CDNB sends a notification message to the CDNA, where identifier information carried therein is the forwarding identifier. As shown in FIG. 7A and FIG. 7B, the route decision method provided by this embodiment includes the following steps.

Step 71: An end user (End User) sends a DNS query request (DNS FQDNA) to the CDNA&RR through a UE.

Step 72: The CDNA&RR judges, through information such as a user location, that it is most suitable for the CDNB to provide a service for the UE, and therefore determines to forward the user request to the CDNB for processing, so that the CDNA allocates a forwarding identifier to the CDNB according to the forwarded user request, and records a correspondence between the forwarding identifier and the CDNB.

Step 73: The CDNA&RR returns an alias name, CNAME, of the CDNB to the UE and an address of a server responsible for parsing the alias name, that is, an address of the CDNB&RR, and further returns the forwarding identifier allocated in step 72.

Step 74: The UE sends a DNS query request (DNS CNAME of CDNB) to the CDNB &RR.

Step 75: The CDNB&RR selects, based on information such as the UE location information and a domain name of a CP of a requested content, a node CDNB DN that finally delivers the content to the UE, and returns an IP address of the CDNB DN to the UE.

Step 76: The UE sends an HTTP request (HTTP URLb) to the CDNB DN, where the request further carries the forwarding identifier allocated in step 72.

Step 77 to step 712 are similar to step 59 to step 514, and are not repeated herein.

Step 713: When the CDNB DN starts delivering the content to the UE for the user request forwarded by the CDNA, generate a notification message (Notify), called a fifth notification message herein, and send the fifth notification message to the CDNA&RR through the CDNB&RR.

Step 713 may be executed in parallel with step 712.

The fifth notification message may carry: the forwarding identifier and start service instruction information; and may further carry at least one of the following information: single traffic; a protocol type, such as HTTP and RTP, used by the CDNB to deliver the content to the UE for the user request forwarded by the CDNA; the domain name, such as "video.sina.com", of the CP of the content delivered by the CDNB to the UE for the user request forwarded by the CDNA, and so on. Further, the fifth notification message may further carry at least one of the following information: a total concurrent request quantity threshold, a total concurrent traffic amount threshold, a total concurrent request quantity threshold and a total concurrent traffic amount threshold of each protocol type, a total concurrent request quantity threshold and a total concurrent traffic amount threshold corresponding to each content provider domain name, which are set by a CDNB administrator. For example: the total concurrent request quantity threshold is 500, the total concurrent traffic amount threshold is 1000M, the total concurrent request quantity threshold of the RTP is 100 and the total concurrent traffic amount threshold thereof is 200M, the total concurrent request quantity threshold of the content provider domain name being "Youtube" is 400 and the total concurrent traffic amount threshold thereof is 800M, and so on.

Step 714: Upon receiving the fifth notification message, the CDNA retrieves the locally recorded current service aggregate of the CDNB according to the forwarding identifier in the fifth notification message, and according to other reference information carried in the fifth notification message, collects statistics on the current service aggregate of the CDNB, and updates the locally recorded corresponding result.

It is assumed that: the current service aggregate includes the current total quantity of concurrent requests and the current total amount of concurrent traffic. The CDNA&RR may execute an add-1 operation on the recorded current total quantity of concurrent requests for the start instruction information carried in the notification message, and according to the single traffic carried in the fifth notification message, execute an add-the-single-traffic operation on the recorded current total amount of concurrent traffic, and update a local corresponding recorded result.

The CDNA&RR may further separately collect statistics on the current total quantity of concurrent requests and the current total amount of concurrent traffic of the CDNB according to the protocol type and the domain name information carried in the fifth notification message.

Step 715: When the CDNB DN stops delivering the content (Data) required by the UE to the UE, the UE notifies the CDNB DN that the content delivery stops.

Step 716: Upon sensing that the content delivery stops, the CDNB DN generates a notification message (Notify), called a sixth notification message herein, and sends the sixth notification message to the CDNA&RR through the CDNB&RR.

Information capable of being carried by the sixth notification message corresponds to the information capable being carried by the fifth notification message in step 713. Specifically, the sixth notification message may carry: the forwarding identifier allocated in step 72 and stop service instruction information, and may further carry at least one of the following information: single traffic; a protocol type, such as HTTP and RTP, used by the CDNB to deliver the content to the UE for the user request forwarded by the CDNA; the domain name, such as "video.sina.com", of the CP of the content delivered by the CDNB to the UE for the user request forwarded by the CDNA, and so on.

Step 717: Upon receiving the sixth notification message, the CDNA retrieves the locally recorded current service aggregate of the CDNB according to the forwarding identifier in the sixth notification message, and according to other reference information carried in the sixth notification message, collects statistics on the current service aggregate of the CDNB, and updates the locally recorded corresponding result.

The CDNA&RR may execute a deduct-1 operation on the locally recorded current total quantity of concurrent requests for the stop instruction information carried in the sixth notification message, and according to the single traffic carried in the sixth notification message, execute a deduct-the-single-traffic operation on the recorded current total amount of concurrent traffic, and update a locally recorded corresponding result. In the case that the CDNA&RR separately collects statistics, it is further required to execute a corresponding deduct-1 or deduct-the-single-traffic operation on the recorded separate statistical data, and update the locally recorded corresponding result.

Subsequently, when a new similar user request arrives at the CDNA, the CDNA judges whether the statistically counted current service aggregate is less than the total service quantity thresholdtotal quantity of services, and if yes, forwards the user request to the CDNB; otherwise, does not forward the user request to the CDNB.

In the route decision method provided by this embodiment, the CDNB sends, to the CDNA, the sixth notification message carrying the reference information used to collect statistics on the current service aggregate of the CDNB, and the sixth notification message carries the forwarding identifier allocated by the CDNA to the CDNB according to the forwarded user request, so that the CDNA retrieves the locally recorded statistical result of the CDNB according to the forwarding identifier, and collects statistics in real time on and updates the locally recorded corresponding result according to other reference information. The CDNA may perform route decision on a to-be-forwarded user request according to the locally recorded latest result, so as to decrease a probability of forwarding the user request to a downstream CDN incapable of providing the service, improve the accuracy of the route decision thereof, and thereby improve the route decision efficiency.

Figure 8:
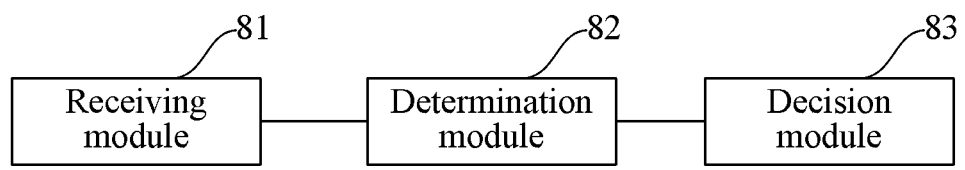
FIG. 8 is a schematic structural diagram of a content delivery apparatus provided by Embodiment 6 of the present invention.

FIG. 8 is a schematic structural diagram of a content delivery apparatus provided by Embodiment 6 of the present invention. The content delivery apparatus shown in FIG. 8 may act as an upstream CDN, and specifically include a receiving module 81, a determination module 82, and a decision module 83.

The receiving module 81 is configured to receive a notification message sent by a downstream CDN, and the notification message is used to determine a current service aggregate of services provided by the downstream CDN for an upstream CDN interconnected with the downstream CDN; where the upstream CDN is the content delivery apparatus described in this embodiment.

The determination module 82 is configured to determine the current service aggregate according to the notification message.

The decision module 83 is configured to, according to the current service aggregate and a total service quantity thresholdtotal quantity of services, perform route decision on a to-be-forwarded user request, where the total service quantity thresholdtotal quantity of services is an upper limit, set by the downstream CDN, of services capable of being provided by the downstream CDN for the upstream CDN.

Specific implementation manners, in which the content delivery apparatus provided by this embodiment, that is, the upstream CDN, determines the current service aggregate, are not limited, and may include, for example, that: the upstream CDN collects statistics and records the statistics; or, the downstream CDN collects statistics and performing reporting, and the upstream CDN records or updates a corresponding result. A specific structure of the content delivery apparatus is separately described below for the two manners.

Manner 1: The upstream CDN collects statistics and records the statistics.

In this manner, optionally, the notification message may include: reference information used to collect statistics on the current service aggregate. Correspondingly, the determination module 82 may specifically be configured to, according to the reference information, collect statistics on and record the current service aggregate.

The reference information may include: identifier information, and start instruction information or stop instruction information. The start instruction information indicates that: the downstream CDN starts providing a service for a user for a user request forwarded by the upstream CDN; the stop instruction information indicates that: the downstream CDN stops providing a service for a user for a user request forwarded by the upstream CDN. The identifier information includes: a CDN identifier of the downstream CDN, or a forwarding identifier allocated by the upstream CDN to the downstream CDN according to a forwarded user request. The current service aggregate includes: a current total quantity of concurrent requests. The total service quantity thresholdtotal quantity of services includes: a total concurrent request quantity threshold. In this case, the determination module 82 may specifically be configured to execute an add-1 operation for the start instruction information or execute a deduct-1 operation for the stop instruction information on the currently recorded current total quantity of concurrent requests of the downstream CDN corresponding to the identifier information, and update a currently recorded corresponding result.

And/or,

The reference information may include: identifier information and single traffic. The identifier information includes: a CDN identifier of the downstream CDN, or a forwarding identifier allocated by the upstream CDN to the downstream CDN according to a forwarded user request. The single traffic is traffic occupied by the downstream CDN to provide a service for a user for a user request currently forwarded by the upstream CDN. The current service aggregate includes: a current total amount of concurrent traffic. The total service quantity thresholdtotal quantity of services includes: a total concurrent traffic amount threshold. In this case, the determination module 82 may specifically be configured to execute an operation of adding or deducting the single traffic on the currently recorded current total amount of concurrent traffic of the downstream CDN corresponding to the identifier information, and update a currently recorded corresponding result.

Further, the reference information may further include: a protocol type used by the downstream CDN to provide a service for a user for a user request currently forwarded by the upstream CDN; the total service quantity thresholdtotal quantity of services further includes: a current total concurrent request quantity threshold and/or a current total concurrent traffic amount threshold of each protocol type. Correspondingly, the determination module 82 may further be configured to separately collect statistics on the current total quantity of concurrent requests and/or the current total amount of concurrent traffic according to the protocol type. And/or, the reference information may further include: a domain name of a content provider for a content requested by a user request currently forwarded by the upstream CDN; the total service quantity thresholdtotal quantity of services further includes: a total concurrent request quantity threshold and/or a total concurrent traffic amount threshold corresponding to each content provider domain name. Correspondingly, the determination module 82 may further be configured to separately collect statistics on the current total quantity of concurrent requests and/or the current total amount of concurrent traffic according to the domain name of the content provider.

Manner 2: The downstream CDN collects statistics and reports the statistics, and the content delivery apparatus, that is the upstream CDN, records or updates a corresponding result.

In this case, the notification message may include: identifier information and the current service aggregate; the identifier information includes a CDN identifier of the downstream CDN, or a forwarding identifier allocated by the upstream CDN to the downstream CDN according to a forwarded user request. Correspondingly, the determination module 82 may specifically be configured to record or update the corresponding result according to the identifier information and the current service aggregate.

The notification message may further include the total service quantity thresholdtotal quantity of services. The total service quantity thresholdtotal quantity of services may include one of or any combination of: a total concurrent request quantity threshold; a total concurrent traffic amount threshold; a total concurrent request quantity threshold and/ or a total concurrent traffic amount threshold of each protocol type; a total concurrent request quantity threshold and/or a total concurrent traffic amount threshold corresponding to each content provider domain name.

The content delivery apparatus provided by this embodiment may act as an upstream CDN, which determines, according to the notification message sent by the downstream CDN interconnected with the content delivery device, the current service aggregate of services provided by the downstream CDN for the upstream CDN interconnected to the downstream CDN, and performs route decision on the to-be-forwarded user request according to a current service volume and the total service quantity thresholdtotal quantity of services, which is set by the downstream CDN and provided by the downstream CDN for the upstream CDN, so as to decrease a probability of forwarding the user request to a downstream CDN incapable of providing a service, thereby improve the accuracy of selecting a downstream CDN for the to-be-forwarded user request, and improve the route decision efficiency. For the implementation mechanism of the content delivery apparatus of this embodiment, reference may be made to the corresponding description of the upstream CDN of FIG. 1 and FIG. 5A to FIG. 7B, which is not repeated herein.

Figure 9:
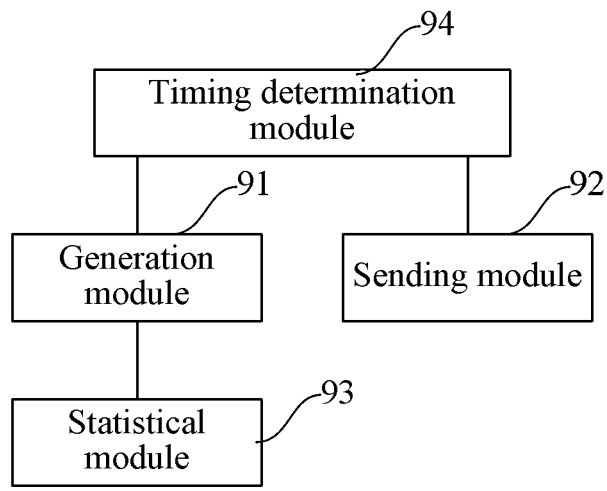
FIG. 9 is a schematic structural diagram of a content delivery apparatus provided by Embodiment 7 of the present invention.

FIG. 9 is a schematic structural diagram of a content delivery apparatus provided by Embodiment 7 of the present invention. As shown in FIG. 9, the content delivery apparatus provided by this embodiment may act as a downstream CDN, and its structure may include: a generation module 91 and a sending module 92.

The generation module 91 may be configured to generate a notification message, and the notification message is used to determine a current service aggregate of services provided by a downstream CDN for an upstream CDN interconnected with the downstream CDN; the downstream CDN includes the content delivery apparatus.

The sending module 92 may be configured to send the notification message to the upstream CDN, so that the upstream CDN performs route decision on a to-be-forwarded user request with reference to the current service aggregate.

The type of the notification message is not limited, and information carried therein may include: reference information used to collect statistics on the current service aggregate; or, identifier information and the statistically counted current service aggregate. Description is separately provided below for the technical solutions corresponding to the two different types of parameters carried in the notification message.

Manner 1: The notification message includes: reference information used to collect statistics on the current service aggregate.

In this case, the reference information may include: identifier information and at least one of the following information: start instruction information, stop instruction information, and single traffic. The identifier information includes: a CDN identifier of the downstream CDN, or a forwarding identifier allocated by the upstream CDN to the downstream CDN according to a forwarded user request. The start instruction information indicates that: the downstream CDN starts providing a service for a user for a user request forwarded by the upstream CDN. The stop instruction information indicates that: the downstream CDN stops providing a service for a user for a user request forwarded by the upstream CDN. The single traffic is traffic occupied by the downstream CDN to provide a service for a user for a user request currently forwarded by the upstream CDN.

Further, the reference information may further include at least one of the following information: a protocol type used by the downstream CDN to provide a service for a user for a user request currently forwarded by the upstream CDN; a domain name of a content provider for a content requested by a user request currently forwarded by the upstream CDN.

Manner 2: The notification message includes: identifier information and the statistically counted current service aggregate.

In this case, the notification message may include: identifier information and the current service aggregate; the identifier information includes a CDN identifier of the downstream CDN, or a forwarding identifier allocated by the upstream CDN to the downstream CDN according to a forwarded user request.

The content delivery apparatus may further include: a statistical module 93. The statistical module 93 may be configured to collect statistics on the current service aggregate of the downstream CDN.

The current service aggregate may include: a current total quantity of concurrent requests. In this case, the statistical module 93 may specifically be configured to, when the downstream CDN starts providing a service for a user for a user request forwarded by the upstream CDN, execute an add-1 operation on the currently recorded current total quantity of concurrent requests; and when the downstream CDN stops providing the service for the user for a user request forwarded by the upstream CDN, execute a deduct-1 operation on the currently recorded current total quantity of concurrent requests.

And/or,

The current service aggregate may include: a current total amount of concurrent traffic. In this case, the statistical module 93 may specifically be configured to execute an operation of adding or deducting single traffic on the currently recorded current total amount of concurrent traffic, and update a currently recorded corresponding result. The single traffic is traffic occupied by a service provided for a user for a user request currently forwarded by the upstream CDN.

Further, the statistical module 93 may further be configured to separately collect statistics on the current total quantity of concurrent requests and/or the current total amount of concurrent traffic according to a protocol type used by the downstream CDN to provide a service for a user for a user request currently forwarded by the upstream CDN; and/or, the statistical module 93 may further be configured to separately collect statistics on the current total quantity of concurrent requests and/or the current total amount of concurrent traffic according to a domain name of a content provider for a content requested by a user request currently forwarded by the upstream CDN.

In the technical solution, the content delivery apparatus may further include a timing determination module 94. The timing determination module 94 may be configured to determine a timing for the generation module to generate the notification message and a timing for the sending module to send the notification message to the upstream CDN. The timing includes: the moment when the downstream CDN starts or stops providing a service for a user for a user request forwarded by the upstream CDN; or the end of each preset duration, where the preset duration is used as a cycle.

In the technical solution, the notification message may further include: a total service quantity thresholdtotal quantity of services. The total service quantity thresholdtotal quantity of services is an upper limit of services capable of being provided by the downstream CDN for the upstream CDN, and may specifically include one of or any combination of: a total concurrent request quantity threshold; a total concurrent traffic amount threshold; a total concurrent request quantity threshold and/or a total concurrent traffic amount threshold of each protocol type; a total concurrent request quantity threshold and/or a total concurrent traffic amount threshold corresponding to each content provider domain name.

The content delivery apparatus provided by this embodiment may act as a downstream CDN, which generates the notification message, including the reference information used to collect statistics on the current service aggregate or including the identifier information and the statistically counted current service aggregate, and sends the notification message to the upstream CDN, so that the upstream CDN may perform route decision on the to-be-forwarded user request with reference to the current service aggregate, so as to improve the accuracy of the upstream CDN in selecting a downstream CDN for the to-be-forwarded user request, and thereby improve route decision efficiency. For the implementation mechanism of the content delivery apparatus of this embodiment, reference may be made to the corresponding description of the downstream CDN of FIG. 3 and FIG. 5A to FIG. 7B, which is not repeated herein.

Figure 10:
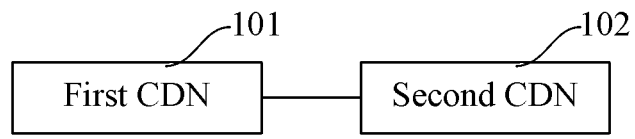
FIG. 10 is a schematic structural diagram of a CDN interconnection system provided by Embodiment 8 of the present invention.

FIG. 10 is a schematic structural diagram of a CDN interconnection system provided by Embodiment 8 of the present invention. The CDN interconnection system shown in FIG. 10 includes: a first CDN101 and a second CDN102. The first CDN101 and the second CDN102 are respectively an upstream CDN and a downstream CDN that are interconnected. For the structure of the first CDN101, reference may be made to the description of the embodiment corresponding to FIG. 8, and for the implementation mechanism thereof, reference may be made to the corresponding description of the upstream CDN in FIG. 1, and FIG. 5A to FIG. 7B; for the structure of the second CDN102, reference may be made to the description of the embodiment corresponding to FIG. 9, and for the implementation mechanism thereof, reference may be made to the corresponding description of the upstream CDN in FIG. 3, and FIG. 5A to FIG. 7B; for distribution of the first CDN101 and the second CDN102 in the CDN interconnection system, reference may be made to the description of FIG. 3, and for a logical interface between the first CDN101 and the second CDN102, reference may be made to the description of FIG. 4; which are not repeated herein.

In the CDN interconnection system provided by this embodiment, the first CDN101, that is the upstream CDN, determines, according to a notification message sent by the second CDN102, that is the downstream CDN, interconnected with the first CDN101, the current service aggregate of services provided by the downstream CDN for the upstream CDN interconnected to the downstream CDN, and performs route decision on a to-be-forwarded user request according to a current service volume and the total service quantity thresholdtotal quantity of services, which is set by the downstream CDN and capable of being provided by the downstream CDN for the upstream CDN, so as to decrease a probability of forwarding the user request to a downstream CDN incapable of providing a service, thereby improve the accuracy of selecting a downstream CDN for the to-be-forwarded user request, and improve the route decision efficiency.

It can be understood by persons of ordinary skill in the art that the accompanying drawings are merely schematic diagrams of an embodiment, and modules or processes in the accompanying drawings are not necessarily required in implementing the present invention.

Persons of ordinary skill in the art may understand that, modules in the apparatuses provided in the embodiment may be arranged in the apparatuses in a distributed manner according to the description of the embodiment, or may be arranged in one or more apparatuses that are different from those described in the embodiments. The modules in the foregoing embodiments may be combined into one module, or split into a plurality of sub-modules.

Persons of ordinary skill in the art may understand that, all or a part of the steps of the foregoing method embodiments may be implemented by a program instructing related hardware. The foregoing programs may be stored in a computer readable storage medium. When the program runs, the foregoing steps of the foregoing method embodiments are performed. The foregoing storage medium includes various mediums capable of storing program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A route decision method, comprising:
   receiving a notification message sent by a downstream content delivery network (CDN), wherein the notification message is used to determine a current service aggregate of services provided by the downstream CDN for an upstream CDN interconnected with the downstream CDN;
   determining the current service aggregate according to the notification message;
   collecting, by the upstream CDN, statistics on the current service aggregate including current total quantity of concurrent requests and current total amount of concurrent traffic; and
   performing route decision on a to-be-forwarded user request according to the current service aggregate, the collected statistics, and a total service quantity thresholdtotal quantity of services, wherein the total service quantity thresholdtotal quantity of services is an upper limit, set by the downstream CDN, of services capable of being provided by the downstream CDN for the upstream CDN.

2. The method according to claim 1, wherein,
   the notification message comprises: reference information used to collect statistics on the current service aggregate; and
   the determining the current service aggregate according to the notification message comprises: collecting statistics on and recording the current service aggregate according to the reference information.

3. The method according to claim 2, wherein,
   the reference information comprises: identifier information, and start instruction information or stop instruction information; the start instruction information indicates that: the downstream CDN starts providing a service for a user for a user request forwarded by the upstream CDN; the stop instruction information indicates that: the downstream CDN stops providing a service for a user for a user request forwarded by the upstream CDN; the identifier information comprises: a CDN identifier of the downstream CDN, or a forwarding identifier allocated by the upstream CDN to the downstream CDN according to a forwarded user request; the current service aggregate comprises: a current total quantity of concurrent requests; and the total service quantity thresholdtotal quantity of services comprises: a total concurrent request quantity threshold; and the collecting statistics on and recording the current service aggregate comprises: executing an add-1 operation for the start instruction information or executing a deduct-1 operation for the stop instruction information on the currently recorded current total quantity of concurrent requests of the downstream CDN corresponding to the identifier information, and updating a currently recorded corresponding result.

4. The method according to claim 3, wherein,
   the reference information further comprises: a protocol type used by the downstream CDN to provide a service for a user for a user request currently forwarded by the upstream CDN; the total service quantity thresholdtotal quantity of services further comprises: a current total concurrent request quantity threshold and/or a current total concurrent traffic amount threshold of each protocol type; and the collecting statistics on the current total quantity of concurrent requests and/or the current total amount of concurrent traffic comprises: separately collecting statistics on the current total quantity of concurrent requests and/or the current total amount of concurrent traffic according to the protocol type;
   and/or,
   the reference information further comprises: a domain name of a content provider for a content requested by a user request currently forwarded by the upstream CDN; the total service quantity thresholdtotal quantity of services further comprises: a total concurrent request quantity threshold and/or a total concurrent traffic amount threshold corresponding to each content provider domain name; and the collecting statistics on the current total quantity of concurrent requests and/or the current total amount of concurrent traffic comprises: separately collecting statistics on the current total quantity of concurrent requests and/or the current total amount of concurrent traffic according to the domain name of the content provider.

5. The method according to claim 2, wherein,
   the reference information comprises: identifier information and single traffic; the identifier information comprises: a CDN identifier of the downstream CDN, or a forwarding identifier allocated by the upstream CDN to the downstream CDN according to a forwarded user request; the single traffic is traffic occupied by the downstream CDN to provide a service for a user for a user request currently forwarded by the upstream CDN; the current service aggregate comprises: a current total amount of concurrent traffic; the total service quantity thresholdtotal quantity of services comprises: a total concurrent traffic amount threshold; and the collecting statistics on and recording the current service aggregate comprises: executing an operation of adding or deducting the single traffic on the currently recorded current total amount of concurrent traffic of the downstream CDN corresponding to the identifier information, and updating a currently recorded corresponding result.

6. The method according to claim 1, wherein,
the notification message comprises: identifier information and the current service aggregate; the identifier information comprises a CDN identifier of the downstream CDN, or a forwarding identifier allocated by the upstream CDN to the downstream CDN according to a forwarded user request; and
the determining the current service aggregate according to the notification message comprises: recording or updating a corresponding result according to the identifier information and the current service aggregate.

7. The method according to claim 1, wherein the notification message further comprises the total service quantity thresholdtotal quantity of services.

8. A route decision method, comprising:
generating a notification message, wherein the notification message is used to determine a current service aggregate of services provided by a downstream CDN for an upstream CDN interconnected with the downstream CDN; and
sending the notification message to the upstream CDN, so that the upstream CDN collects statistics on the current service aggregate including current total quantity of concurrent requests and current total amount of concurrent traffic, and performs route decision on a to-be-forwarded user request with reference to the current service aggregate and the collected statistics.

9. The method according to claim 8, wherein,
the notification message comprises: reference information used to collect statistics on the current service aggregate;
the reference information comprises: identifier information and at least one of the following information: start instruction information, stop instruction information, and single traffic; and
the identifier information comprises: a CDN identifier of the downstream CDN, or a forwarding identifier allocated by the upstream CDN to the downstream CDN according to a forwarded user request; the start instruction information indicates that: the downstream CDN starts providing a service for a user for a user request forwarded by the upstream CDN; the stop instruction information indicates that: the downstream CDN stops providing a service for a user for a user request forwarded by the upstream CDN; the single traffic is traffic occupied by the downstream CDN to provide a service for a user for a user request currently forwarded by the upstream CDN.

10. The method according to claim 9, wherein the reference information further comprises at least one of the following information:
a protocol type used by the downstream CDN to provide a service for a user for a user request currently forwarded by the upstream CDN; and
a domain name of a content provider for a content requested by a user request currently forwarded by the upstream CDN.

11. The method according to claim 8, wherein,
the notification message comprises: identifier information and the current service aggregate; the identifier information comprises a CDN identifier of the downstream CDN, or a forwarding identifier allocated by the upstream CDN to the downstream CDN according to a forwarded user request.

12. The method according to claim 11, wherein before the generating a notification message, the method further comprises:
collecting statistics on the current service aggregate of the downstream CDN.

13. The method according to claim 12, wherein,
the current service aggregate comprises: a current total quantity of concurrent requests; and the collecting statistics on the current service aggregate of the downstream CDN comprises: when the downstream CDN starts providing a service for a user for a user request forwarded by the upstream CDN, executing an add-1 operation on the currently recorded current total quantity of concurrent requests; and when the downstream CDN stops providing the service for the user for a user request forwarded by the upstream CDN, executing a deduct-1 operation on the currently recorded current total quantity of concurrent requests;
and/or,
the current service aggregate comprises a current total amount of concurrent traffic; the collecting statistics on the current service aggregate of the downstream CDN comprises: executing an operation of adding or deducting single traffic on the currently recorded current total amount of concurrent traffic, and updating a currently recorded corresponding result; the single traffic is traffic occupied by a service provided for a user for a user request currently forwarded by the upstream CDN.

14. The method according to claim 13, wherein the collecting statistics on the current service aggregate of the downstream CDN comprises:
separately collecting statistics on the current total quantity of concurrent requests and/or the current total amount of concurrent traffic according to a protocol type used by the downstream CDN to provide a service for a user for a user request currently forwarded by the upstream CDN;
and/or,
separately collecting statistics on the current total quantity of concurrent requests and/or the current total amount of concurrent traffic according to a domain name of a content provider for a requested content.

15. The method according to claim 8, wherein a timing for generating the notification message and a timing for sending the notification message to the upstream CDN comprise:
the moment when the downstream CDN starts or stops providing a service for a user for a user request forwarded by the upstream CDN; or
the end of each preset duration, wherein the preset duration is used as a cycle.

16. The method according to claim 8, wherein,
the notification message further comprises a total service quantity thresholdtotal quantity of services; and the total service quantity thresholdtotal quantity of services is an upper limit of services capable of being provided by the downstream CDN for the upstream CDN; and
the total service quantity thresholdtotal quantity of services comprises one of or any combination of: a total concurrent request quantity threshold; a total concurrent traffic amount threshold; a total concurrent request quantity threshold and/or a total concurrent traffic amount threshold of each protocol type; a total concurrent request quantity threshold and/or a total concurrent traffic amount threshold corresponding to each content provider domain name.

17. A content delivery apparatus, the content delivery apparatus acting as an upstream CDN, comprising:

at least one memory for storage of a plurality of instructions;

a receiving module, configured to receive a notification message sent by a downstream CDN, wherein the notification message is used to determine a current service aggregate of services provided by the downstream CDN for the upstream CDN interconnected with the downstream CDN;

a determination module, configured to determine the current service aggregate according to the notification message and collect statistics on the current service aggregate including current total quantity of concurrent requests and current total amount of concurrent traffic; and a decision module, configured to, according to the current service aggregate, the collected statistics, and a total service quantity thresholdtotal quantity of services, perform route decision on a to-be-forwarded user request, wherein the total service quantity thresholdtotal quantity of services is an upper limit, set by the downstream CDN, of services capable of being provided by the downstream CDN for the upstream CDN.

18. The apparatus according to claim 17, wherein, the notification message comprises: reference information used to collect statistics on the current service aggregate; and the determination module is specifically configured to, according to the reference information, collect statistics on and record the current service aggregate.

19. The apparatus according to claim 18, wherein, the reference information comprises: identifier information, and start instruction information or stop instruction information; the start instruction information indicates that: the downstream CDN starts providing a service for a user for a user request forwarded by the upstream CDN; the stop instruction information indicates that: the downstream CDN stops providing a service for a user for a user request forwarded by the upstream CDN; the identifier information comprises: a CDN identifier of the downstream CDN, or a forwarding identifier allocated by the upstream CDN to the downstream CDN according to a forwarded user request; the current service aggregate comprises: a current total quantity of concurrent requests; and the total service quantity thresholdtotal quantity of services comprises: a total concurrent request quantity threshold; and the determination module is specifically configured to execute an add-1 operation for the start instruction information or execute a deduct-1 operation for the stop instruction information on the currently recorded current total quantity of concurrent requests of the downstream CDN corresponding to the identifier information, and update a currently recorded corresponding result.

20. The apparatus according to claim 19, wherein, the reference information further comprises: a protocol type used by the downstream CDN to provide a service for a user for a user request currently forwarded by the upstream CDN; the total service quantity thresholdtotal quantity of services further comprises: a current total concurrent request quantity threshold and/or a current total concurrent traffic amount threshold of each protocol type; and the determination module is further configured to separately collect statistics on the current total quantity of concurrent requests and/or the current total amount of concurrent traffic according to the protocol type;

and/or, the reference information further comprises: a domain name of a content provider for a content requested by a user request currently forwarded by the upstream CDN; the total service quantity thresholdtotal quantity of services further comprises: a total concurrent request quantity threshold and/or a total concurrent traffic amount threshold corresponding to each content provider domain name; and the determination module is further configured to separately collect statistics on the current total quantity of concurrent requests and/or the current total amount of concurrent traffic according to the domain name of the content provider.

21. The apparatus according to claim 18, wherein, the reference information comprises: identifier information and single traffic; the identifier information comprises: a CDN identifier of the downstream CDN, or a forwarding identifier allocated by the upstream CDN to the downstream CDN according to a forwarded user request; the single traffic is traffic occupied by the downstream CDN to provide a service for a user for a user request currently forwarded by the upstream CDN; the current service aggregate comprises: a current total amount of concurrent traffic; the total service quantity thresholdtotal quantity of services comprises: a total concurrent traffic amount threshold; and the determination module is specifically configured to execute an operation of adding or deducting the single traffic on the currently recorded current total amount of concurrent traffic of the downstream CDN corresponding to the identifier information, and update a currently recorded corresponding result.

22. The apparatus according to claim 17, wherein, the notification message comprises: identifier information and the current service aggregate; the identifier information comprises a CDN identifier of the downstream CDN, or a forwarding identifier allocated by the upstream CDN to the downstream CDN according to a forwarded user request; and the determination module is specifically configured to record or update a corresponding result according to the identifier information and the current service aggregate.

23. The apparatus according to claim 17, wherein, the notification message further comprises: the total service quantity thresholdtotal quantity of services.

24. A content delivery apparatus, the content delivery apparatus acting as a downstream CDN, comprising:

at least one memory for storage of a plurality of instructions;

a generation module, configured to generate a notification message, wherein the notification message is used to determine a current service aggregate of services provided by a downstream CDN for an upstream CDN interconnected with the downstream CDN; and a sending module, configured to send the notification message to the upstream CDN, so that the upstream CDN collects statistics on the current service aggregate including current total quantity of concurrent requests and current total amount of concurrent traffic, and performs route decision on a to-be-forwarded user request with reference to the collected statistics and the current service aggregate.

25. The apparatus according to claim 24, wherein,
the notification message comprises: reference information used to collect statistics on the current service aggregate; and
the reference information comprises: identifier information and at least one of the following information: start instruction information, stop instruction information, and single traffic; and
the identifier information comprises: a CDN identifier of the downstream CDN, or a forwarding identifier allocated by the upstream CDN to the downstream CDN according to a forwarded user request; the start instruction information indicates that: the downstream CDN starts providing a service for a user for a user request forwarded by the upstream CDN; the stop instruction information indicates that: the downstream CDN stops providing a service for a user for a user request forwarded by the upstream CDN; the single traffic is traffic occupied by the downstream CDN to provide a service for a user for a user request currently forwarded by the upstream CDN.

26. The apparatus according to claim 25, wherein,
the reference information further comprises at least one of the following information:
a protocol type used by the downstream CDN to provide a service for a user for a user request currently forwarded by the upstream CDN; and
a domain name of a content provider for a content requested by a user request currently forwarded by the upstream CDN.

27. The apparatus according to claim 24, wherein,
the notification message comprises: identifier information and the current service aggregate; the identifier information comprises a CDN identifier of the downstream CDN, or a forwarding identifier allocated by the upstream CDN to the downstream CDN according to a forwarded user request.

28. The apparatus according to claim 24, further comprising:
a statistical module, configured to collect statistics on the current service aggregate of the downstream CDN.

29. The apparatus according to claim 28, wherein,
the current service aggregate comprises: a current total quantity of concurrent requests; and the statistical module is specifically configured to: when the downstream CDN starts providing a service for a user for a user request forwarded by the upstream CDN, execute an add-1 operation on the currently recorded current total quantity of concurrent requests; and when the downstream CDN stops providing the service for the user for a user request forwarded by the upstream CDN, execute a deduct-1 operation on the currently recorded current total quantity of concurrent requests;
and/or,
the current service aggregate comprises a current total amount of concurrent traffic; the statistical module is specifically configured to: execute an operation of adding or deducting single traffic on the currently recorded current total amount of concurrent traffic, and update a currently recorded corresponding result; and the single traffic is traffic occupied by a service provided for a user for a user request currently forwarded by the upstream CDN.

30. The apparatus according to claim 29, wherein,
the statistical module is further configured to separately collect statistics on the current total quantity of concurrent requests and/or the current total amount of concurrent traffic according to a protocol type used by the downstream CDN to provide a service for a user for a user request currently forwarded by the upstream CDN;
and/or,
the statistical module is further configured to separately collect statistics on the current total quantity of concurrent requests and/or the current total amount of concurrent traffic according to a domain name of a content provider for a content requested by a user request currently forwarded by the upstream CDN.

31. The apparatus according to claim 24, further comprising:
a timing determination module, configured to determine a timing for the generation module to generate the notification message and a timing for the sending module to send the notification message to the upstream CDN; wherein the timing comprises:
the moment when the downstream CDN starts or stops providing a service for a user for a user request forwarded by the upstream CDN; or
the end of each preset duration, wherein the preset duration is used as a cycle.

32. The apparatus according to any one of claim 24, wherein,
the notification message further comprises a total service quantity thresholdtotal quantity of services; and the total service quantity thresholdtotal quantity of services is an upper limit of services capable of being provided by the downstream CDN for the upstream CDN; and
the total service quantity thresholdtotal quantity of services comprises one of or any combination of: a total concurrent request quantity threshold; a total concurrent traffic amount threshold; a total concurrent request quantity threshold and/or a total concurrent traffic amount threshold of each protocol type; a total concurrent request quantity threshold and/or a total concurrent traffic amount threshold corresponding to each content provider domain name.

* * * * *